(12) United States Patent
Ding et al.

(10) Patent No.: US 12,166,665 B2
(45) Date of Patent: Dec. 10, 2024

(54) METHOD AND APPARATUS FOR PERFORMING MULTI-HOP TRANSMISSION IN A SHARED RESOURCE POOL

(71) Applicant: HUAWEI TECHNOLOGIES CO., LTD., Guangdong (CN)

(72) Inventors: Mengying Ding, Shanghai (CN); Shuri Liao, Shanghai (CN); Peng Zhang, Shanghai (CN); Hua Xu, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/852,701

(22) Filed: Jun. 29, 2022

(65) Prior Publication Data

US 2022/0329515 A1    Oct. 13, 2022

Related U.S. Application Data

(63) Continuation of application No. PCT/CN2019/130737, filed on Dec. 31, 2019.

(51) Int. Cl.
*H04L 45/00* (2022.01)
*H04L 45/24* (2022.01)
(Continued)

(52) U.S. Cl.
CPC .............. *H04L 45/20* (2013.01); *H04L 45/24* (2013.01); *H04L 45/42* (2013.01); *H04L 47/781* (2013.01)

(58) Field of Classification Search
CPC ......... H04L 45/20; H04L 45/24; H04L 45/42; H04L 47/781; H04W 4/40; H04W 4/46; H04W 72/04; H04W 72/40
See application file for complete search history.

(56) References Cited

U.S. PATENT DOCUMENTS

2016/0338119 A1\* 11/2016 Bodas ................... H04W 72/51
2017/0214607 A1    7/2017 Kim et al.
(Continued)

FOREIGN PATENT DOCUMENTS

CN    106612554 A    5/2017
CN    110290592 A    9/2019
(Continued)

OTHER PUBLICATIONS

Extended European Search Report issued in EP19958154.7, dated Nov. 4, 2022, 8 pages.
(Continued)

*Primary Examiner* — Jeong S Park

(57) ABSTRACT

This application discloses a multi-hop transmission method and an apparatus, which are applicable to fields such as V2X, internet of vehicles, intelligent connected vehicles, assisted driving, and intelligent driving, to resolve a problem that a multi-hop transmission latency is large in a conventional technology. In example embodiments, terminal devices participating in multi-hop transmission may share a shared resource pool. A first terminal device and a second terminal device participating in the multi-hop transmission are used as an example. The multi-hop transmission method includes: sending, by the first terminal device, data to the second terminal device on a first resource in the shared resource pool; and if the first terminal device fails to send the data on the first resource, retransmitting, by the first terminal device, the data to the second terminal device on a second resource in the shared resource pool.

14 Claims, 9 Drawing Sheets

(51) Int. Cl.
  *H04L 45/42*   (2022.01)
  *H04L 47/78*   (2022.01)

(56) References Cited

U.S. PATENT DOCUMENTS

| | | | | |
|---|---|---|---|---|
| 2017/0230959 A1* | 8/2017 | Wu | ........................ | H04W 72/02 |
| 2017/0289845 A1* | 10/2017 | Chiu | .................... | H04W 28/065 |
| 2017/0325243 A1* | 11/2017 | Yasukawa | .............. | H04L 5/0048 |
| 2017/0353819 A1* | 12/2017 | Yin | ......................... | H04W 4/70 |
| 2018/0206260 A1* | 7/2018 | Khoryaev | ............. | H04W 72/56 |
| 2019/0288800 A1* | 9/2019 | Hosseini | ................. | H04L 1/189 |
| 2020/0229198 A1* | 7/2020 | Kung | ..................... | H04W 72/54 |
| 2021/0306824 A1* | 9/2021 | Li | ............................ | H04W 4/40 |
| 2022/0150923 A1* | 5/2022 | Wang | ................ | H04W 72/1263 |

FOREIGN PATENT DOCUMENTS

| | | |
|---|---|---|
| EP | 1976175 A2 | 10/2008 |
| WO | 2018208114 A1 | 11/2018 |

OTHER PUBLICATIONS

Huawei Hisilicon, "3GPP TSG RAN Meeting #85 RP-191831", Further views on Rel-17 work area on NR sidelink enhancements for V2X and other use cases, Sep. 9, 2019, total 13 pages.
OPPO, "3GPP TSG-RAN WG Meeting #86 RP-192753", Summary of email discussion on Rel-17 Sidelink Relaying, Dec. 2, 2019, total 35 pages.
International Search Report and Written Opinion issued in PCT/2019/130737, dated Sep. 30, 2020, 9 pages.

\* cited by examiner

METHOD AND APPARATUS FOR PERFORMING MULTI-HOP TRANSMISSION IN A SHARED RESOURCE POOL

CROSS-REFERENCE TO RELATED APPLICATIONS

This application is a continuation of International Application No. PCT/CN2019/130737, filed on Dec. 31, 2019, the disclosure of which is hereby incorporated by reference in its entirety.

TECHNICAL FIELD

This application relates to the field of communication technologies, and in particular, to a multi-hop transmission method and an apparatus.

BACKGROUND

Long term evolution (LTE) may improve uplink coverage by using an L3 relay technology. For example, a user 1 receives a physical sidelink shared channel (PSSCH) sent by a user 0, and the PSSCH carries data 1. The user 1 decodes the PSSCH to obtain original bits of the data 1. The user 1 re-codes and modulates the original bits and forwards them to a base station through a physical uplink shared channel (PUSCH).

Currently, dynamic scheduling needs to be performed for each hop of transmission in the L3 relay technology. For example, a base station needs to dynamically schedule a sidelink (SL) time-frequency resource for transmission from the user 0 to the user 1, and the base station needs to dynamically schedule an uplink transmission resource for transmission from the user 1 to the base station. Therefore, a large latency is generated during multi-hop transmission.

SUMMARY

This application provides a multi-hop transmission method and an apparatus, and the multi-hop transmission method and an apparatus may be applied to a communication system, for example, a vehicle-to-everything (V2X) communication system, a vehicle-to-vehicle (V2V) communication system, a long term evolution-vehicle (LTE-V) communication system, an internet of vehicles communication system, a machine type communication (MTC) communication system, an internet of things (IoT) communication system, a long term evolution-machine (LTE-M) communication system, or a machine-to-machine (M2M) communication system, to resolve a problem in a conventional technology that a multi-hop transmission latency is large.

According to a first aspect, an embodiment of this application provides a multi-hop transmission method, where the method is applied to a plurality of terminal devices that perform multi-hop transmission in a shared resource pool, the plurality of terminal devices include a first terminal device and a second terminal device, and the method includes: The first terminal device sends data to the second terminal device on a first resource. If the first terminal device fails to send the data on the first resource, the first terminal device retransmits the data to the second terminal device on a second resource. The shared resource pool includes the first resource and the second resource, and the first resource and the second resource are consecutive in time domain.

In this embodiment of this application, the terminal devices participating in the multi-hop transmission may share the shared resource pool. In comparison with a conventional-technology manner in which a base station is requested to perform scheduling for each hop of SL transmission, the shared resource pool may be configured in one scheduling process, so that a transmission latency can be reduced. In addition, because resources are shared between the terminal devices participating in the multi-hop transmission, a problem of a waste of preconfigured resources for subsequent hops caused by a failure of a hop can be avoided.

In a possible design, before the first terminal device sends the data to the second terminal device on the first resource, the first terminal device may receive configuration information sent by a network device, where the configuration information is used to configure the shared resource pool for the first terminal device and the second terminal device. In the foregoing design, the network device configures the shared resource pool for the first terminal device and the second terminal device through one-time scheduling. Compared with the conventional-technology manner in which the base station is requested to perform scheduling for each hop of SL transmission, the foregoing design can reduce the transmission latency.

In a possible design, the first terminal device may alternatively send sidelink control information (SCI) on the first resource, and the SCI may carry an identifier of the first terminal device and/or an identifier of the second terminal device. In the foregoing design, the second terminal device may determine, based on the SCI, to receive data starting from the first resource.

In a possible design, before the first terminal device sends the data to the second terminal device on the first resource, the first terminal device receives indication information sent by the network device, where the indication information is used to indicate a path for the multi-hop transmission to the first terminal device, the second terminal device and a third terminal device and a next hop of the first terminal device on the path is the second terminal device. In the foregoing design, the network device dynamically indicates the path for the multi-hop transmission, so that communication quality of the multi-hop transmission can be provided.

In a possible design, same modulation and coding scheme (MCS) configuration is used for each hop of the multi-hop transmission. In the foregoing design, a failure of transmission at a hop and termination of the multi-hop transmission that are caused by independent configuration of an MCS at each hop can be avoided, and this helps the plurality of terminal devices share resources in the shared resource pool.

In a possible design, each hop of the multi-hop transmission corresponds to a same redundancy version (RV) sequence. The foregoing design helps the plurality of terminal devices share resources in the shared resource pool.

In a possible design, each resource in the shared resource pool may include a PSSCH resource, and the PSSCH resource may be used to send bearer data.

In a possible design, each resource in the shared resource pool may include a physical sidelink feedback channel (PSFCH) resource, and the PSFCH resource may be used to send feedback information (such as an ACK/a NACK) for data.

In a possible design, each resource in the shared resource pool may include a PSCCH resource, and the PSCCH resource may be used to send the SCI.

In a possible design, each resource starting from an $(N+1)^{th}$ resource in the shared resource pool includes an uplink feedback channel, and the uplink feedback channel is used by the terminal device to feed back, to the network device, whether the multi-hop transmission is successful, where N is a quantity of terminal devices in the multi-hop transmission.

In a possible design, each resource in the shared resource pool includes an uplink feedback channel, and the uplink feedback channel is used by the terminal device to feed back, to the network device, whether the multi-hop transmission is successful.

According to a second aspect, an embodiment of this application provides a multi-hop transmission method, where the method is applied to a plurality of terminal devices that perform multi-hop transmission in a shared resource pool, the plurality of terminal devices include a first terminal device, a second terminal device and a third terminal device, and the method includes: The second terminal device receives data sent by the first terminal device on a first resource. If the second terminal device successfully receives the data, the second terminal device sends first feedback information specific to the data to the first terminal device, and sends the data to the third terminal device on a second resource. Alternatively, if the second terminal device fails to receive the data, the second terminal device receives, on a second resource, the data retransmitted by the first terminal device, where the shared resource pool includes the first resource and the second resource, and the first resource and the second resource are consecutive in time domain.

In this embodiment of this application, the terminal devices participating in the multi-hop transmission may share the shared resource pool. In comparison with a conventional-technology manner in which a base station is requested to perform scheduling for each hop of SL transmission, the shared resource pool may be configured in one scheduling process, so that a transmission latency can be reduced. In addition, because resources are shared between the terminal devices participating in the multi-hop transmission, a problem of a waste of preconfigured resources for subsequent hops caused by a failure of a hop can be avoided.

In a possible design, before the second terminal device receives, on the first resource, the data sent by the first terminal device, the second terminal device may receive configuration information sent by a network device, where the configuration information is used to configure the shared resource pool for the first terminal device, the second terminal device, and the third terminal device. In the foregoing design, the network device configures the shared resource pool for the first terminal device and the second terminal device through one-time scheduling. Compared with the conventional-technology manner in which the base station is requested to perform scheduling for each hop of SL transmission, the foregoing design can reduce the transmission latency.

In a possible design, the second terminal device may alternatively receive first SCI on the first resource, and the first SCI may carry an identifier of the first terminal device and/or an identifier of the second terminal device. In the foregoing design, the second terminal device may determine, based on the first SCI, to receive the data starting from the first resource.

In a possible design, the second terminal device may alternatively send second SCI to the third terminal device on the second resource, where the second SCI may carry the identifier of the second terminal device and/or an identifier of the third terminal device. In the foregoing design, the third terminal device may determine, based on the second SCI, to receive the data starting from the second resource.

In a possible design, before the second terminal device sends the data to the third terminal device on the second resource, the second terminal device may receive indication information sent by the network device, where the indication information is used to indicate a path for the multi-hop transmission to the first terminal device, the second terminal device, and the third terminal device and a next hop of the second terminal device on the path is the third terminal device. In the foregoing design, the network device dynamically indicates the path for the multi-hop transmission, so that communication quality of the multi-hop transmission can be provided.

In a possible design, a same MCS configuration is used for each hop of the multi-hop transmission. In the foregoing design, a failure of transmission at a hop and termination of the multi-hop transmission that are caused by independent configuration of an MCS at each hop can be avoided, and this helps the plurality of terminal devices share resources in the shared resource pool.

In a possible design, each hop of the multi-hop transmission corresponds to a same redundancy version (RV) sequence. The foregoing design helps the plurality of terminal devices share resources in the shared resource pool.

In a possible design, after the second terminal device receives, on the second resource, the data retransmitted by the first terminal device, if the second resource is a last resource in the shared resource pool, the second terminal device sends second feedback information to the network device, where the second feedback information is used to indicate that the multi-hop transmission fails. In the foregoing design, the second terminal device can notify the network device in time that the multi-hop transmission fails, so that the network device can reallocate a resource for the multi-hop transmission, to improve communication quality of the multi-hop transmission.

In a possible design, each resource in the shared resource pool may include a PSSCH resource, and the PSSCH resource may be used to send the data.

In a possible design, each resource in the shared resource pool may include a PSFCH resource, and the PSFCH resource may be used to send feedback information (such as an ACK/a NACK) for data.

In a possible design, each resource in the shared resource pool may include a PSCCH resource, and the PSCCH resource may be used to send the SCI.

In a possible design, each resource starting from an $(N+1)^{th}$ resource in the shared resource pool includes an uplink feedback channel, and the uplink feedback channel is used by the terminal device to feed back, to the network device, whether the multi-hop transmission is successful, where N is a quantity of terminal devices in the multi-hop transmission.

In a possible design, each resource in the shared resource pool includes the uplink feedback channel, and the uplink feedback channel is used by the terminal device to feed back, to the network device, whether the multi-hop transmission is successful.

According to a third aspect, an embodiment of this application provides a multi-hop transmission method, where the method is applied to a plurality of terminal devices that perform multi-hop transmission in a shared resource pool, the plurality of terminal devices include a second terminal device and a third terminal device, and the method includes: The third terminal device receives data sent by the second terminal device on a second resource. If the third terminal device successfully receives the data, the third terminal device sends first feedback information to a network device, where the first feedback information is used to indicate that the multi-hop transmission is completed. Alternatively, if the third terminal device successfully receives the data and a third resource is unused, the third terminal device sends, on the third resource, the data to the network device, where the shared resource pool includes the second resource and the third resource, and the second resource and the third resource are consecutive in time domain.

In this embodiment of this application, the terminal devices participating in the multi-hop transmission may share the shared resource pool. In comparison with a conventional-technology manner in which a base station is requested to perform scheduling for each hop of SL transmission, the shared resource pool may be configured in one scheduling process, so that a transmission latency can be reduced. In addition, because resources are shared between the terminal devices participating in the multi-hop transmission, a problem of a waste of preconfigured resources for subsequent hops caused by a failure of a hop can be avoided.

In addition, the third terminal device sends the feedback information to the network device after successfully receiving the data, so that the network device can schedule an uplink transmission resource in time, to reduce a transmission latency. In addition, after receiving the feedback information, the network device may release an unused resource, to improve resource utilization.

Alternatively, if resources in the shared resource pool are unused up, the third terminal device may send the data to the network device on an unused resource, so that a transmission latency can be reduced, and resource utilization can be further improved.

In a possible design, before the third terminal device receives, on the second resource, the data sent by the second terminal device, the third terminal device may receive configuration information sent by the network device, where the configuration information is used to configure the shared resource pool for the second terminal device, and the third terminal device. In the foregoing design, the network device configures the shared resource pool for a first terminal device and the second terminal device through one-time scheduling. Compared with the conventional-technology manner in which the base station is requested to perform scheduling for each hop of SL transmission, the foregoing design can reduce the transmission latency.

In a possible design, the third terminal device may alternatively receive SCI on the second resource, and the SCI may carry an identifier of the second terminal device and/or an identifier of the third terminal device. In the foregoing design, the third terminal device may determine, based on the SCI, to receive the data starting from the second resource.

In a possible design, before the third terminal device sends the first feedback information to the network device, the third terminal device receives indication information sent by the network device, where the indication information is used to indicate a path for the multi-hop transmission to the first terminal device, the second terminal device, and the third terminal device and a next hop of the third terminal device on the path is the network device. In the foregoing design, the network device dynamically indicates the path for the multi-hop transmission, so that communication quality of the multi-hop transmission can be provided.

In a possible design, before the third terminal device sends the data to the network device on the third resource, the third terminal device receives indication information sent by the network device, where the indication information is used to indicate a path for the multi-hop transmission to the first terminal device, the second terminal device, and the third terminal device and a next hop of the third terminal device on the path is the network device. In the foregoing design, the network device dynamically indicates the path for the multi-hop transmission, so that communication quality of the multi-hop transmission can be provided.

In a possible design, a same MCS configuration is used for each hop of the multi-hop transmission. In the foregoing design, a failure of transmission at a hop and termination of the multi-hop transmission that are caused by independent configuration of an MCS at each hop can be avoided, and this helps the plurality of terminal devices share resources in the shared resource pool.

In a possible design, each hop of the multi-hop transmission corresponds to a same redundancy version (RV) sequence. The foregoing design helps the plurality of terminal devices share resources in the shared resource pool.

In a possible design, each resource in the shared resource pool may include a PSSCH resource, and the PSSCH resource may be used to send the data.

In a possible design, each resource in the shared resource pool may include a PSFCH resource, and the PSFCH resource may be used to send feedback information (such as an ACK/a NACK) for data.

In a possible design, each resource in the shared resource pool may include a PSCCH resource, and the PSCCH resource may be used to send the SCI.

In a possible design, each resource starting from an $(N+1)^{th}$ resource in the shared resource pool includes an uplink feedback channel, and the uplink feedback channel is used by the terminal device to feed back, to the network device, whether the multi-hop transmission is successful, where N is a quantity of terminal devices in the multi-hop transmission.

In a possible design, each resource in the shared resource pool includes the uplink feedback channel, and the uplink feedback channel is used by the terminal device to feed back, to the network device, whether the multi-hop transmission is successful.

According to a fourth aspect, this application provides a multi-hop transmission apparatus, where the apparatus may be a terminal device, or may be a chip or a chip group in the terminal device. The apparatus may include a processing unit and a transceiver unit. When the apparatus is the terminal device, the processing unit may be a processor, and the transceiver unit may be a transceiver. The apparatus may further include a storage module, and the storage module may be a memory. The storage module is configured to store instructions, and the processing unit executes the instructions stored in the storage module, to enable the terminal device perform a corresponding function in the first aspect, the second aspect, or the third aspect. When the apparatus is the chip or the chip set in the terminal device, the processing unit may be a processor, and the transceiver unit may be an input/output interface, a pin, a circuit, or the like. The processing unit executes instructions stored in a storage module, to enable the terminal device to perform a corresponding function in the first aspect, the second aspect, or the third aspect. The storage module may be a storage module (for example, a register or a cache) in the chip or the chip set, or a storage module (for example, a read-only memory or a random access memory) that is in the terminal device and that is located outside the chip or the chip set.

According to a fifth aspect, a multi-hop transmission apparatus is provided, including a processor, a communication interface, and a memory. The communication interface is configured to transmit information, and/or a message, and/or data between the apparatus and another apparatus. The memory is configured to store computer-executable instructions. When the apparatus runs, the processor executes the computer-executable instructions stored in the memory, to enable the apparatus perform the multi-hop transmission method according to any one of the first aspect or the designs of the first aspect, or any one of the second aspect or the designs of the second aspect, or any one of the third aspect or the designs of the third aspect.

According to a sixth aspect, an embodiment of this application provides a readable storage medium, where the readable storage medium is configured to store instructions, and when the instructions are executed, the method according to any one of the first aspect or the possible designs of the first aspect, any one of the second aspect or the designs of the second aspect, or any one of the third aspect or the designs of the third aspect in embodiments of this application is implemented.

According to a seventh aspect, an embodiment of this application provides a computer program product, where when the computer program product is run on a terminal device, the terminal device is enabled to perform the method according to any one of the first aspect or the possible designs of the first aspect, any one of the second aspect or the designs of the second aspect, or any one of the third aspect or the designs of the third aspect in embodiments of this application.

According to an eighth aspect, an embodiment of this application provides a chip, where the chip is coupled to a memory, and performs the method according to any one of the first aspect or the possible designs of the first aspect, any one of the second aspect or the designs of the second aspect, or any one of the third aspect or the designs of the third aspect in embodiments of this application.

According to a ninth aspect, an embodiment of this application provides a communication apparatus, where the apparatus includes at least one processor, and the at least one processor is coupled to at least one memory. The at least one processor is configured to execute a computer program or instructions stored in the at least one memory, to enable the apparatus to perform the method according to any one of the first aspect or the possible designs of the first aspect, any one of the second aspect or the designs of the second aspect, or any one of the third aspect or the designs of the third aspect in embodiments of this application.

According to a tenth aspect, an embodiment of this application provides a communication apparatus, including a processor and an interface circuit. The interface circuit is configured to receive code instructions and transmit the code instructions to the processor; and the processor runs the code instructions to perform the method according to any one of the first aspect or the possible designs of the first aspect, any one of the second aspect or the designs of the second aspect, or any one of the third aspect or the designs of the third aspect in embodiments of this application.

According to an eleventh aspect, an embodiment of this application provides a communication system. The system includes a plurality of terminal devices, and the plurality of terminal devices perform multi-hop transmission in a shared resource pool. In a possible design, the plurality of terminal devices include a first terminal device, a second terminal device, and a third terminal device. The first terminal device performs any one of the first aspect and the possible designs of the first aspect in embodiments of this application, the second terminal device performs any one of the second aspect and the possible designs of the second aspect in embodiments of this application, and the third terminal device performs any one of the third aspect and the possible designs of the third aspect in embodiments of this application.

In addition, for technical effects brought by the second aspect to the eleventh aspect, refer to the descriptions in the first aspect. Details are not described herein again.

It should be noted that "coupling" in embodiments of this application indicates a direct combination or an indirect combination of two components.

DESCRIPTION OF EMBODIMENTS

Figure 1:
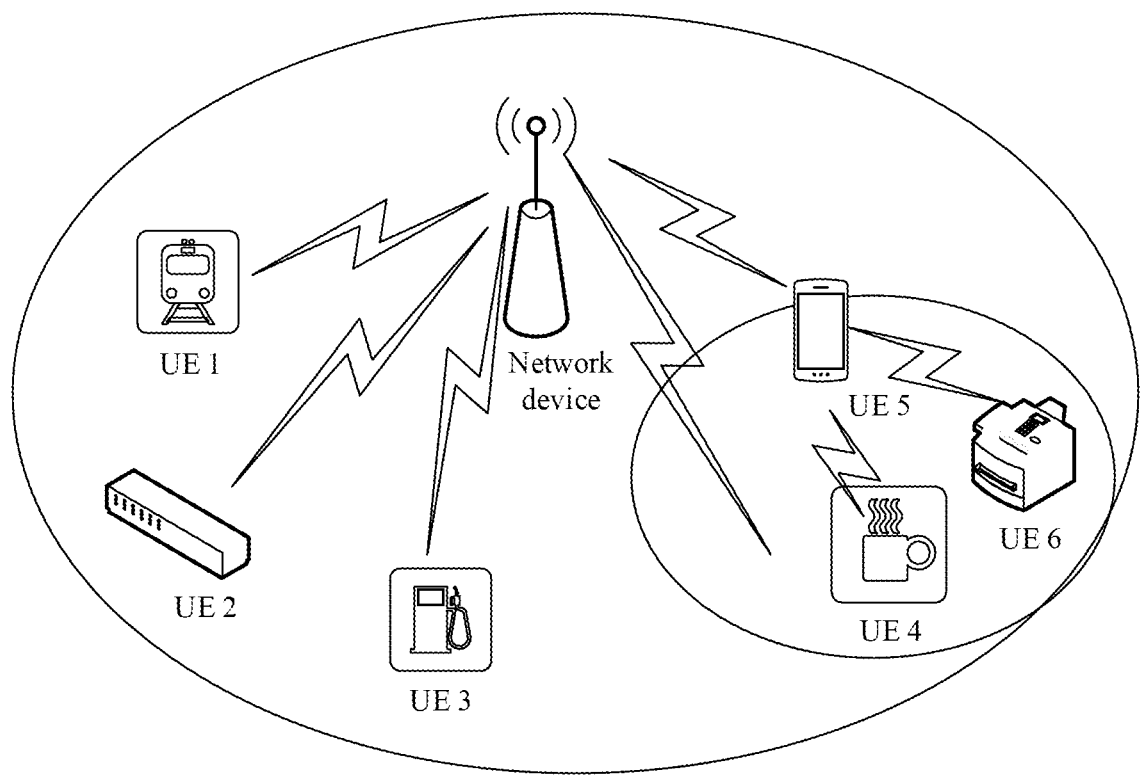
FIG. 1 is a schematic diagram of an architecture of a communication system according to an embodiment of this application.

To make objectives, technical solutions, and advantages of this application clearer, the following further describes this application in detail with reference to accompanying drawings.

A multi-hop transmission method provided in this application may be applied to various communication systems, for example, an internet of things (IoT) system, a vehicle-to-everything (V2X) system, a narrow band internet of things (NB-IoT) system, an LTE system, a 5th generation (5G) communication system, an LTE-NR mixed architecture, or a 5G new radio (NR) system, and a new communication system emerging in future communication development.

A terminal device in embodiments of this application is an entity on a user side that is configured to receive or transmit a signal. The terminal device may be a device that provides a user with voice and/or data connectivity, for example, a handheld device or a vehicle-mounted device having a wireless connection function. The terminal device may alternatively be another processing device connected to a wireless modem. The terminal device may communicate with a radio access network (RAN). The terminal device may also be referred to as a wireless terminal, a subscriber unit, a subscriber station, a mobile station, a mobile console, a remote station, an access point, a remote terminal, an access terminal, a user terminal, a user agent, a user device (user device), user equipment (UE), or the like. The terminal device may be a mobile terminal, for example, a mobile phone (or referred to as a "cellular" phone), and a computer that has a mobile terminal. For example, the terminal device may be a portable, pocket-sized, handheld, computer built-in, or a vehicle-mounted mobile apparatus, which exchanges a voice and/or data with the radio access network. For example, the terminal device may alternatively be a device such as a personal communication service (PCS) phone, a cordless telephone set, a session initiation protocol (SIP) phone, a wireless local loop (WLL) station, or a personal digital assistant (PDA). For example, common terminal devices include a mobile phone, a tablet computer, a notebook computer, a palmtop computer, a mobile internet device (MID), and a wearable device such as a smartwatch, a smart band, or a pedometer. However, embodiments of this application are not limited thereto.

A network device in embodiments of this application is an entity on a network side configured to transmit or receive a signal. For example, the network device may be an evolved NodeB (evolutional NodeB, eNB or e-NodeB) in LTE, a new radio controller (NR controller), a gNodeB (gNB) in a 5G system, a centralized network element (centralized unit), a new radio base station, a radio remote module, a micro base station, a relay, a distributed network element (distributed unit), a reception point (transmission reception point, TRP), a transmission point (TP), or any other radio access device. However, embodiments of this application are not limited thereto. The network device may cover one or more cells.

FIG. 1 shows a communication system according to an embodiment of this application. The communication system includes a network device and six terminal devices, for example, UE 1 to UE 6. In the communication system, the UE 1 to the UE 6 may send signals to the network device on an uplink, and the network device may receive the uplink signals sent by the UE 1 to the UE 6. In addition, a communication subsystem may alternatively include the UE 4 to the UE 6. The network device may send downlink signals to the UE 1, the UE 2, the UE 3, and the UE 5 on a downlink. The UE 5 may send signals to the UE 4 and the UE 6 in the SL based on a device-to-device (D2D) technology. FIG. 1 is merely a schematic diagram, and a type of the communication system, a quantity of devices included in the communication system, a type of the device included in the communication system, and the like are not specifically limited in this application.

A network architecture and a service scenario described in embodiments of this application are intended to describe the technical solutions in embodiments of this application more clearly, and do not constitute a limitation on the technical solutions provided in embodiments of this application. A person of ordinary skill in the art may know that with evolution of the network architecture and emergence of a new service scenario, the technical solutions provided in embodiments of this application are also applicable to similar technical problems.

LTE can use an L3 relay technology to improve uplink coverage. For example, a user 1 receives a PSSCH sent by a user 0, and the PSSCH carries data 1. The user 1 decodes the PSSCH to obtain original bits of the data 1. The user 1 re-codes and modulates the original bits and forwards them to a base station through a PUSCH.

Currently, dynamic scheduling needs to be performed for each hop of transmission in the L3 relay technology. For example, the user 0 transmits the data to the base station through the user 1. Before sending the data to the user 1, the user 0 requests an SL time-frequency resource from the base station, the base station schedules the SL time-frequency resource for the user 0, and the user 0 sends the data to the user 1 on the SL time-frequency resource. After successfully receiving the data sent by the user 0, the user 1 requests an uplink transmission resource from the base station. The base station schedules an uplink transmission time-frequency resource for the user 1, and the user 1 forwards the data from the user 0 to the base station on the uplink transmission time-frequency resource. Therefore, a large latency is generated during a multi-hop transmission scheme.

Embodiments of this application provide a multi-hop transmission method and an apparatus, to reduce a latency of multi-hop transmission. The method and the apparatus are based on a same technical concept. Because a problem-resolving principle of the method is similar to that of the apparatus, mutual reference may be made to implementation of the apparatus and the method. Repeated parts are not described in detail.

"Consecutive in time domain" in embodiments of this application may mean logically consecutive. For example, a shared resource pool includes a slot 1, a slot 2, a slot 5, and a slot 8, the slot 1 and the slot 2 are consecutive in time domain, the slot 2 and the slot 5 are consecutive in time domain, and the slot 5 and the slot 8 are consecutive in time domain. It may also mean being physically consecutive, or may be understood as being adjacent in time domain.

Forwarding in embodiments of this application may refer to forwarding original data, or may refer to decoding and forwarding. The decoding and forwarding means that a forwarding node decodes received data, re-codes and modulates the received data, and then forwards the received data. For example, the user 1 receives the PSSCH sent by the user 0, and the PSSCH carries the data 1. The user 1 decodes the PSSCH to obtain original bits of the data 1. The user 1 re-codes and modulates the original bits and forwards them to the base station through the PUSCH.

In addition, it should be understood that, in descriptions of this application, terms such as "first" and "second" are merely used for distinguishing and description, but should not be understood as an indication or implication of relative importance, or an indication or implication of a sequence.

It should be understood that, in embodiments of this application, "at least one" means one or more, and "a plurality of" means two or more. The term "and/or" describes an association relationship between associated objects, and represents that three relationships may exist. For example, A and/or B may represent any of the following cases: Only A exists, both A and B exist, or only B exists, where A and B may be singular or plural. The character "/" generally represents an "or" relationship between the associated objects. "At least one of the following items (pieces)" or a similar expression thereof indicates any combination of these items, including a single item (piece) or any combination of a plurality of items (pieces). For example, at least one of a, b, and c may indicate a, b, c, a and b, a and c, b and c, or a, b, and c, where a, b, and c may be singular or plural.

The following specifically describes the multi-hop transmission method provided in this application with reference to the accompanying drawings. The method may be applied to the communication system shown in FIG. 1. Specifically, the method may be applied to a plurality of terminal devices that perform multi-hop transmission in a shared resource pool. The shared resource pool includes a plurality of time domain units (t_0, t_1, ..., t_M) arranged in chronological order based on time. These time domain units may be physically consecutive or nonconsecutive, and each time domain unit includes one frequency domain unit to form one resource. For example, a time domain unit may be a slot, a mini-slot, a symbol, or the like, and the frequency domain unit may be a resource block (RB), or the like.

A data transmission direction of the multi-hop transmission including N hops is: terminal device 0→terminal device 1→terminal device 2→ ... →(terminal device i−2)→(terminal device i−1)→(terminal device i)→(terminal device i+1)→ ... →terminal device N, where N is an integer greater than or equal to 1. A process of transmitting data from the terminal device 0 to the terminal device 1 is first-hop transmission. The terminal device 0 is a terminal device on a data transmit side in the first-hop transmission, and the terminal device 1 is a terminal device on a data receive side in the first-hop transmission. A process of transmitting data from the terminal device 1 to the terminal device 2 is second-hop transmission. The terminal device 1 is a terminal device on a data transmit side in the second-hop transmission, and the terminal device 2 is a terminal device on a data receive side in the second-hop transmission. By analogy, a process of transmitting data from a terminal device N−1 to a terminal device N is $N^{th}$-hop transmission. The terminal device N−1 is a terminal device on a data transmit side in the $N^{th}$-hop transmission, and the terminal device N is a terminal device on a data receive side in the $N^{th}$-hop transmission.

In conclusion, in an $(i-1)^{th}$ hop of the multi-hop transmission, a terminal device on a data transmit side is a terminal device i−2, and a terminal device on a data receive side is a terminal device i−1. In an $i^{th}$ hop of the multi-hop transmission, a terminal device on a data transmit side is a terminal device i−1, and a terminal device on a data receive side is a terminal device i. In an $(i+1)^{th}$ hop of the multi-hop transmission, a terminal device on a data transmit side is a terminal device i, and a terminal device on a data receive side is a terminal device i+1, where i={1, 2, 3, ..., N}.

An $i^{th}$-hop transmission process of the multi-hop transmission may include the following steps.

S1: The terminal device i−1 sends data to the terminal device i starting from an $m^{th}$ resource in a shared resource set, where m={1, 2, 3, ..., M}, and the shared resource set includes M resources sorted in ascending order of time domain indexes. Each resource in the shared resource pool may include one time domain unit in time domain, and may include one frequency domain unit in frequency domain.

If i=1, to be specific, the terminal device i−1 (namely, the terminal device 0) is a first node for the multi-hop transmission, the $m^{th}$ time-frequency resource may be a $1^{st}$ time-frequency resource in the shared resource set: or if i={2, 3, 4, ..., N}, to be specific, the terminal device i−1 is an intermediate node for the multi-hop transmission, the $m^{th}$ time-frequency resource may be a next time-frequency resource after successful (i−1)th-hop transmission in the shared resource set, that is, the terminal device i−1 successfully receives a next time-frequency resource after data sent by the terminal device i−2 in the multi-hop transmission.

Optionally, when performing transmission with the terminal device i, the terminal device i−1 may alternatively send SCI to the terminal device i, and the SCI may carry an identifier of the terminal device i−1 and/or an identifier of the terminal device i. In an implementation, for example, SCI carries the identifier of the terminal device i. The SCI may include the identifier of the terminal device i, or the SCI may be scrambled by using the identifier of the terminal device i.

In some embodiments, the terminal device i−1 may send the SCI on each resource used for transmitting data to the terminal device i. Therefore, the terminal device i may determine, based on the SCI sent on the resource, that data needs to be received on the resource.

In some other embodiments, the terminal device i−1 may send the SCI on a resource (namely, the $m^{th}$ resource) on which the terminal device i−1 transmits data to the terminal device i for the first time. Therefore, the terminal device i may determine, based on the SCI sent on the $m^{th}$ resource, that data needs to be received starting from the $m^{th}$ resource.

S2: The terminal device i receives, starting from the $m^{th}$ time-frequency resource in the shared resource set, data sent by the terminal device i−1.

In some embodiments, if the terminal device i fails to receive the data on the $m^{th}$ time-frequency resource, the terminal device i−1 may transmit data to the terminal device i on (m+1)th time-frequency resource: or if the terminal device i fails to receive the data on $(m+1)^{th}$ time-frequency resource, the terminal device i−1 may transmit data to the terminal device i on (m+2)th time-frequency resource. By analogy, until the terminal device i successfully receives the data, or there is no remaining resource in the shared resource pool, that is, m=M, the terminal device i−1 may stop transmitting data to the terminal device i.

In an implementation, if the terminal device i successfully receives the data, the terminal device i may send an ACK to the terminal device i−1: or if the terminal device i fails to receive the data, the terminal device i may not send feedback information to the terminal device i−1. Therefore, when the terminal device i−1 does not receive the ACK sent by the terminal device i for the data, the terminal device i−1 may determine that the terminal device i does not successfully receive the data.

In another implementation, if the terminal device i successfully receives the data, the terminal device i may send an ACK to the terminal device i−1: or if the terminal device i fails to receive the data, the terminal device i may alternatively send a NACK to the terminal device i−1. Therefore, when the terminal device i−1 receives the NACK sent by the terminal device i for the data, the terminal device i−1 may determine that the terminal device i does not successfully receive the data.

For example, each resource in the shared resource pool may include a PSSCH resource, and the PSSCH resource may be used to send the data. In a specific embodiment, when sending data to the terminal device i on the $m^{th}$ resource in the multi-hop transmission, the terminal device i−1 may send the data to the terminal device i on a PSSCH resource on the $m^{th}$ resource.

Each resource in the shared resource pool may include a PSFCH resource, and the PSFCH resource may be used to send feedback information (such as an ACK/a NACK) for data. Therefore, if the terminal device i successfully receives the data on the $m^{th}$ resource, the terminal device i may send an ACK to the terminal device i−1 on a PSFCH resource of the $m^{th}$ resource: or if the terminal device i fails to receive the data on the $m^{th}$ resource, the terminal device i may alternatively send a NACK to the terminal device i−1 on a PSFCH resource of the $m^{th}$ resource.

Each resource in the shared resource pool may include a PSCCH resource, and the PSCCH resource may be used to send the SCI. In a specific embodiment, when sending the SCI on the $m^{th}$ resource, the terminal device i−1 may send the PSCCH to the terminal device i on a PSCCH resource on the $m^{th}$ resource, and the PSCCH may carry the SCI.

In an implementation, in a transmission process between the terminal device i−1 and the terminal device i, if the SCI is sent only on a resource (namely, the $m^{th}$ resource) used for first-time data transmission, the terminal device i−1 and the terminal device i may occupy the PSCCH resource to send data in a retransmission process. For example, the terminal device i−1 and the terminal device i send the SCI on the PSCCH resource of the $m^{th}$ resource, and when retransmitting data on an $(m+1)^{th}$ resource, the terminal device i−1 and the terminal device i may occupy the PSCCH resource of the $(m+1)^{th}$ resource to send the data. When the data is retransmitted on an $(m+2)^{th}$ resource, a PSCCH resource of the $(m+2)^{th}$ resource may be occupied to send the data. This rule also applies to other cases.

Figure 2:
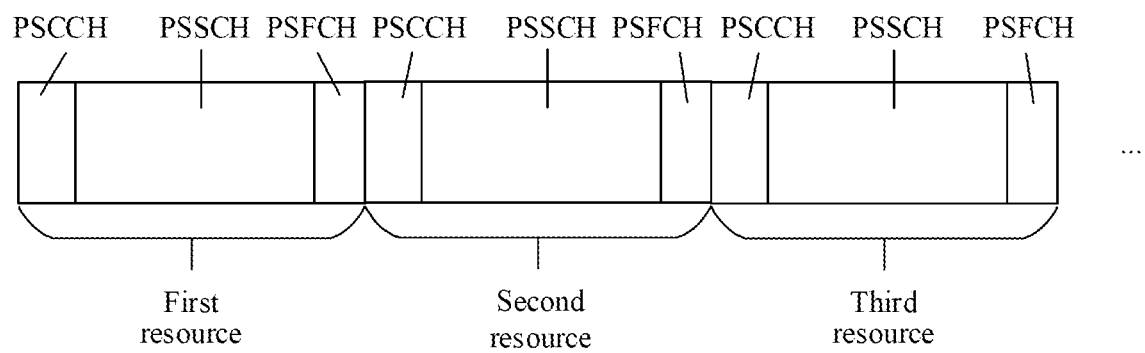
FIG. 2 is a schematic diagram of resources in a shared resource pool according to an embodiment of this application.

For example, FIG. 2 shows a structure of resources in a shared resource pool.

If there is no remaining resource in the shared resource pool, but multi-hop transmission is not completed, the following process may be performed: If all resources in the shared resource pool are used, and the terminal device i still fails to receive data sent by the terminal device i−1, the terminal device i may send, to the network device, feedback information used to indicate that the multi-hop transmission fails. For example, the terminal device i still fails to receive data sent by the terminal device i−1 on an $M^{th}$ resource, the terminal device i may send, to the network device, the feedback information used to indicate that the multi-hop transmission fails.

Figure 3:
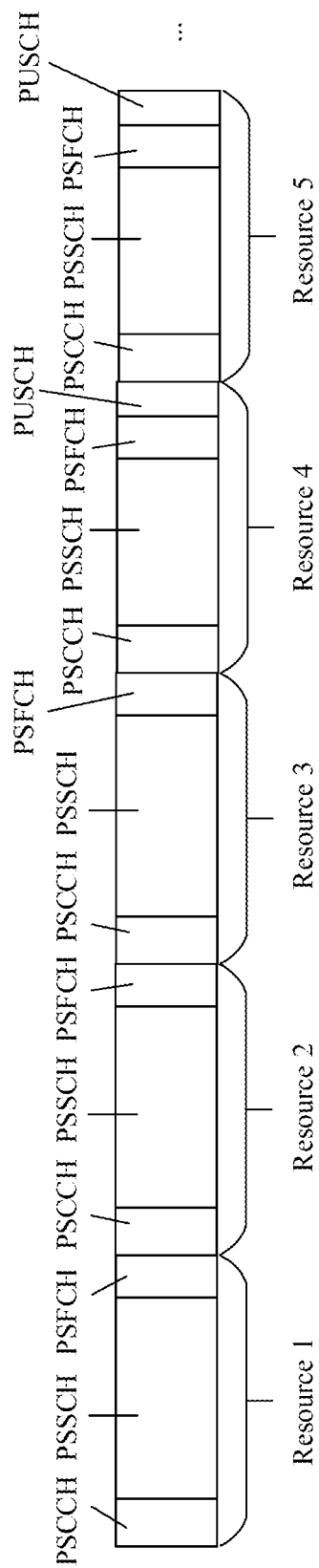
FIG. 3 is a schematic diagram of resources in another shared resource pool according to an embodiment of this application.
Figure 4:
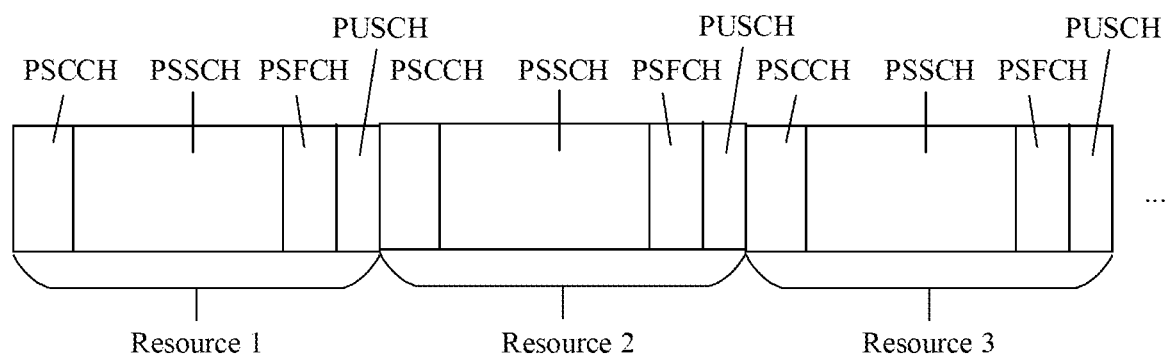
FIG. 4 is a schematic diagram of resources in still another shared resource pool according to an embodiment of this application.

For example, each resource starting from an $N^{th}$ resource in the shared resource pool includes a physical uplink control channel (PUCCH) resource. For example, assuming that N is equal to 4, resources in the shared resource pool may be shown in FIG. 3. Alternatively, each resource in the shared resource pool includes a PUCCH resource, for example, as shown in FIG. 4. The PUCCH resource may be used to send feedback information indicating whether the multi-hop transmission succeeds.

In a possible implementation, the $M^{th}$ resource in the shared resource pool may include N+1 PUCCH resources, where the N+1 PUCCH resources respectively correspond to a terminal device 0 to a terminal device N. The terminal device i may send, to the network device on a PUCCH resource corresponding to the terminal device i, feedback information used to indicate that multi-hop transmission fails.

In another possible implementation, when sending, to the network device, the feedback information used to indicate that the multi-hop transmission fails, the terminal device i may include the identifier of the terminal device i in the feedback information.

Optionally, after receiving the feedback information used to indicate that the multi-hop transmission fails, the network device may reallocate a resource for the multi-hop transmission, for example, allocate a new shared resource pool for the multi-hop transmission. For example, resources may be allocated for multi-hop transmission from the terminal device i−1 to the terminal device N.

If the multi-hop transmission is completed, the following process may be performed: If the terminal device N successfully receives, on a $j^{th}$ time-frequency resource in a shared resource set, data sent by a terminal device N−1, the terminal device N sends feedback information to a base station on the $j^{th}$ time-frequency resource, where the feedback information is used to notify the network device that the multi-hop transmission is completed, and j={M−N, M−N+1, M−N+2, M−N+3, . . . , M}.

Alternatively, if the multi-hop transmission is completed, the following process may be performed: If the terminal device N successfully receives, on a $j^{th}$ time-frequency resource in a shared resource set, data sent by a terminal device N−1, the terminal device N sends data to the network device on a $(j+1)^{th}$ time-frequency resource, and j={M−N, M−N+1, M−N+2, M−N+3, . . . , M}. In this process, the terminal device N may send a physical uplink shared channel (PUSCH) to the network device on the $(j+1)^{th}$ time-frequency resource, where the PUSCH carries data.

Optionally, after receiving the feedback information used to indicate that the multi-hop transmission is completed, the network device may release an unused resource in the shared resource pool.

In a possible implementation, a path for the multi-hop transmission may be dynamically indicated by the network device. For example, a first node (namely, the terminal device 0) in the multi-hop transmission may send an uplink transmission scheduling request to the network device. The network device may determine the path for the multi-hop transmission, and send, to the terminal device 0 to the terminal device N, indication information used to indicate the path. In an example description, the network device may preconfigure one or more paths of the multi-hop transmission, and after receiving the uplink transmission scheduling request sent by the first node, the network device selects one path from preconfigured paths. In another example description, after receiving the uplink transmission scheduling request sent by the first node, the network device may determine the path for the multi-hop transmission based on a channel measurement status of the first node and a status of a user that can help the first node perform relay transmission in a cell.

Optionally, before dynamically indicating the path for the multi-hop transmission, the network device may determine that the first node can perform relay uplink transmission of the user. For example, the network device may determine, based on the channel measurement status of the first node and the status of the user that can help the first node perform relay transmission in the cell, that the first node can perform the uplink relay transmission of the user.

In another possible implementation, the path for the multi-hop transmission may be preconfigured for the terminal device 0 to the terminal device N.

For example, a same MCS configuration is used for each hop of the multi-hop transmission. A failure of transmission at a hop and termination of the multi-hop transmission that are caused by independent configuration of an MCS at each hop can be avoided, and this helps a plurality of terminal devices share resources in the shared resource pool. In addition, by using this solution, if transmission at a hop fails in one resource, because MCS configurations of all hops are the same, a transmission code rate actually used in transmission at each hop may be dynamically adjusted through repeated transmission.

For example, each hop of the multi-hop transmission corresponds to a same redundancy version (RV) sequence. The RV sequence may include K RVs, so that the RVs in the RV sequence may be sequentially used in each hop during transmission, where K may be an integer greater than 0. For example, for each hop, when hth-time transmission is performed, an (h mod K)$^{th}$ RV in the RV sequence may be used. For example, when K is equal to 4, the RV sequence may be {0, 2, 3, 1}, {0, 3, 0, 3}, {0, 0, 0, 0}, or the like.

For example, assuming that the RV sequence is 0231, when the terminal device i−1 transmits data to the terminal device i on the m$^{th}$ resource (that is, first-time transmission at an i$^{th}$ hop), RV 0 may be used. When the terminal device i−1 transmits data to the terminal device i on an (m+1)$^{th}$ resource (that is, second-time transmission at the i$^{th}$ hop), RV 2 may be used. When the terminal device i−1 transmits data to the terminal device i on an (m+2)$^{th}$ resource (that is, third-time transmission at the i$^{th}$ hop), RV 3 may be used. When the terminal device i−1 transmits data to the terminal device i on an (m+3)$^{th}$ resource (that is, fourth-time transmission at the i$^{th}$ hop), RV 1 may be used. When the terminal device i−1 transmits data to the terminal device i on an (m+4)th resource (that is, fifth-time transmission at the i$^{th}$ hop), RV 0 may be used. When the terminal device i−1 transmits data to the terminal device i on an (m+5)$^{th}$ resource (that is, sixth-time transmission at the i$^{th}$ hop), RV 2 may be used. This rule also applies to other cases.

In an example description, different resources in the shared resource pool have different frequency hopping configurations (for example, frequency hopping patterns) based on different time. In the foregoing manner, the frequency hopping configurations are related only to a resource, and is not related to a terminal device in the multi-hop transmission. Therefore, anti-interference performance can be improved, and a plurality of terminal devices can share resources in the shared resource pool more conveniently at the same time.

In a possible implementation, the shared resource pool may be dynamically configured by the network device. For example, before performing multi-hop transmission, the first node may send the uplink transmission scheduling request to the network device. The network device sends configuration information of the shared resource pool to the terminal device 0 to the terminal device N.

In another possible implementation, the shared resource pool may be preconfigured.

The configuration information in the shared resource pool may alternatively include an MCS configuration, an RV sequence configuration, a frequency hopping configuration, and the like.

In a specific implementation, the first node may send the uplink transmission scheduling request to the network device. After receiving the uplink transmission scheduling request, the network device schedules, by using a physical downlink control channel (PDCCH), a time-frequency resource for the first node to upload a buffer status reporting (BSR). After receiving the BSR reported by the first node, the network device configures the shared resource pool by using the PDCCH. All the terminal devices from the terminal device 0 to the terminal device N that participate in the multi-hop transmission can receive the PDCCH. For example, the network device preconfigures a same relay radio network temporary identifier (R-RNTI) for the terminal device 0 to the terminal device N on the path. When configuring the shared resource pool by using the PDCCH, the network device may scramble the PDCCH by using the R-RNTI. A transmission configuration of downlink control information (DCI) carried by the PDCCH may include configurations of the shared resource pool, such as a time-frequency resource configuration, a frequency hopping configuration, a DMRS configuration, or an MCS configuration.

In an example description, there may be a correspondence between a shared resource pool and a path for the multi-hop transmission.

Figure 5:
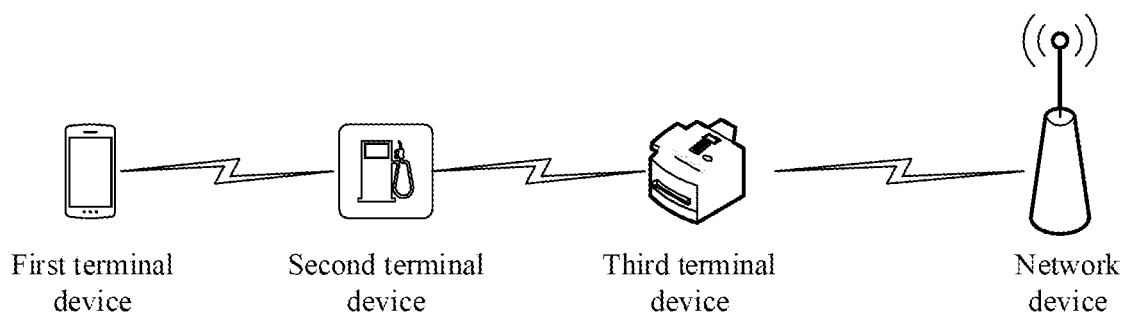
FIG. 5 is a schematic diagram of a multi-hop transmission path according to an embodiment of this application.

The following describes a multi-hop transmission method provided in this application by using an example in which a plurality of terminal devices include three terminal devices: a first terminal device, a second terminal device, and a third terminal device. A transmission path for data may be the first terminal device→the second terminal device→the third terminal device→the network device, as shown in FIG. 5. The first terminal device may be a terminal device on a data send side of a first hop in multi-hop transmission, or may be understood as a first node in the multi-hop transmission. The second terminal device may be a terminal device on a data receive side of a first hop in the multi-hop transmission, or may be a terminal device on a data send side of a second hop in the multi-hop transmission. The third terminal device may be a terminal device on a data receive side of a third hop (also a last hop) in the multi-hop transmission, or may be understood as a tail node in the multi-hop transmission.

Figure 6:
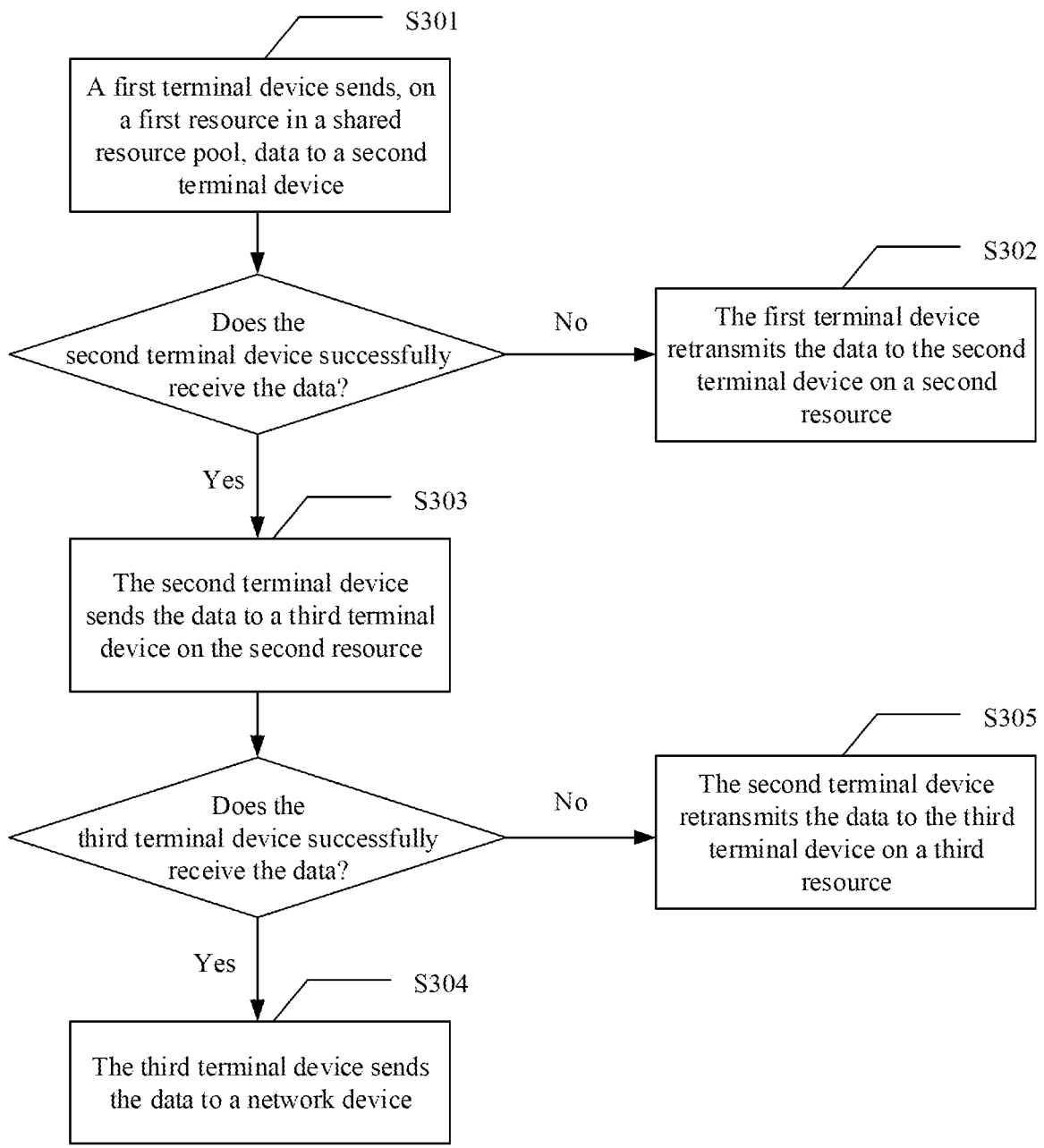
FIG. 6 is a schematic flowchart of a multi-hop transmission method according to an embodiment of this application.

FIG. 6 is a multi-hop transmission method according to an embodiment of this application, and the method may include the following steps.

S 301: A first terminal device sends, on a first resource in a shared resource pool, data to a second terminal device. Correspondingly, the second terminal device receives the data on the first resource. If the second terminal device fails to receive the data, step S302 is performed: or if the second terminal device successfully receives the data, step S303 is performed.

For example, in the multi-hop transmission method shown in FIG. 6, the first resource may be a 1$^{st}$ resource sorted in ascending order of time domain indexes in the shared resource pool, a second resource may be a 2$^{nd}$ resource sorted in ascending order of time domain indexes in the shared resource pool, a third resource may be a 3$^{rd}$ resource sorted in ascending order of time domain indexes in the shared resource pool, and so on.

S302: The first terminal device retransmits the data to the second terminal device on the second resource. Correspondingly, the second terminal device receives the data sent by the first terminal device on the second resource, where the shared resource pool includes the first resource and the second resource, and the first resource and the second resource are consecutive in time domain.

In some embodiments, the first terminal device may start to send the data to the second terminal device on the first resource in the shared resource pool. If the first terminal device fails to perform transmission on the first resource, the first terminal device repeatedly transmits the data to the second terminal device on the second resource. If the first terminal device fails to perform transmission on the second resource, the first terminal device repeatedly transmits the data to the second terminal device on the third resource. The rest can be deduced by analogy, until the second terminal device successfully receives the data, or until there is no remaining resource in the shared resource pool.

For a specific process in which the first terminal device sends the data to the second terminal device, refer to the foregoing i$^{th}$-hop transmission process. Details are not repeated.

In some embodiments, if all resources in the shared resource pool are used, but the second terminal device still fails to receive the data sent by the first terminal device, the second terminal device may send, to a network device, feedback information used to indicate that multi-hop transmission fails. For details about a process in which the second terminal device may send, to the network device, the feedback information used to indicate that the multi-hop transmission fails, refer to the foregoing process in which the $(i+1)^{th}$ terminal device sends, to the network device, the feedback information used to indicate that the multi-hop transmission fails. Details are not repeated.

S303: The second terminal device sends the data to a third terminal device on the second resource. Correspondingly, the third terminal device receives the data sent by the second terminal device on the second resource. If the third terminal device successfully receives the data, step S304 is performed: or if the third terminal device fails to receive the data, step S305 is performed.

In some embodiments, the second terminal device may start to send the data to the third terminal device on the second resource in the shared resource pool. If the second terminal device fails to perform transmission on the second resource, the second terminal device repeatedly transmits the data to the third terminal device on the third resource. If the second terminal device fails to perform transmission on the third resource, the second terminal device repeatedly transmits the data to the third terminal device on a fourth resource. The rest can be deduced by analogy, until the second terminal device successfully receives the data, or until there is no remaining resource in the shared resource pool.

For a specific process in which the second terminal device sends the data to the third terminal device, refer to the foregoing $i^{th}$-hop transmission process. Details are not repeated.

S304: The third terminal device sends the data to the network device.

In an implementation, the third terminal device may send, to the network device, feedback information used to indicate that the multi-hop transmission is completed. After receiving the feedback information, the network device may allocate an uplink transmission resource to the third terminal device. The third terminal device may send the data to the network device by using the uplink transmission resource.

Optionally, after receiving the feedback information used to indicate that the multi-hop transmission is completed, the network device may release an unused resource in the shared resource pool.

In another implementation, if the unused resource (for example, the third resource) exists in the shared resource pool, the third terminal device sends the data to the network device on the third resource. The second resource and the third resource are consecutive in time domain.

S305: The second terminal device retransmits the data to the third terminal device on the third resource. Correspondingly, the third terminal device receives the data sent by the second terminal device on the third resource.

In this embodiment, the terminal devices participating in the multi-hop transmission may share the shared resource pool. In comparison with a conventional-technology manner in which a base station is requested to perform scheduling for each hop of SL transmission, the shared resource pool may be configured in one scheduling process, so that a transmission latency can be reduced. In addition, because resources are shared between the terminal devices participating in the multi-hop transmission, a problem of a waste of preconfigured resources for subsequent hops caused by a failure of a hop can be avoided.

For details about a usage rule of the MCS, the RV, and the frequency hopping configuration in a process of data transmission between the first terminal device and the second terminal device and a process of data transmission between the second terminal device and the third terminal device, refer to the usage rule of the MCS, the RV, and the frequency hopping configuration in the $i^{th}$ hop transmission process. Details are not repeated.

In a multi-hop transmission process shown in FIG. 6, for details about a path for the multi-hop transmission and a method for configuring the shared resource pool, refer to the path for the multi-hop transmission in the $i^{th}$-hop transmission process and the method for configuring the shared resource pool. Details are not repeated.

To better understand embodiments of this application, the following specifically describes, with reference to specific scenarios, the multi-hop transmission method provided in embodiments of this application.

Scenario 1: Sidelink transmission and Uu link transmission use different frequency bands. In other words, the sidelink transmission is out-of-band transmission. The multi-hop transmission process may include the following steps:

A1: A UE 0 sends an uplink transmission scheduling request to a network device.

A2: The network device determines, based on a channel measurement status of the UE 0 and a status of a user that can help the UE 0 perform relay transmission in a cell, that the UE 0 can perform user relay uplink transmission.

Figure 7:
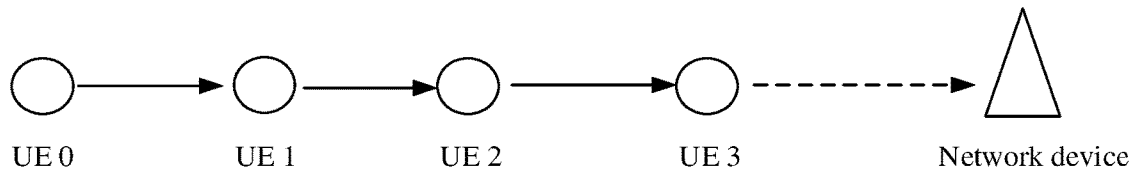
FIG. 7 is a schematic diagram of a multi-hop transmission path according to an embodiment of this application.

A3: The network device indicates the UE 0, a UE 1, a UE 2, and a UE 3 to perform multi-hop transmission by using a path (the UE 0, the UE 1, the UE 2, the UE 3). For example, the path (the UE 0, the UE 1, the UE 2, the UE 3) may be shown in FIG. 7.

A4: The network device sends a PDCCH 1 to the UE 0, where the PDCCH 1 is used to schedule a resource for uploading a BSR.

A5: The UE 0 sends the BSR to the network device on a resource scheduled by the PDCCH 1.

A6: The network device sends a PDCCH 2 to the UE 0, the UE 1, the UE 2 and the UE 3, where the PDCCH 2 is scrambled by using an R-RNTI corresponding to the path (the UE 0, the UE 1, the UE 2, the UE 3), and the PDCCH 2 carries configuration information in the shared resource pool. For example, the configuration information in the shared resource pool includes a time-frequency resource configuration, a frequency hopping configuration, a demodulation reference signal (DMRS) configuration, an MCS configuration, an RV configuration, and the like.

The shared resource pool may include a plurality of time domain units (t_0, t_1, . . . , t_M) arranged in chronological order based on time. These time domain units may be physically consecutive or nonconsecutive, and each time domain unit includes one frequency domain unit to form one time-frequency resource. For ease of description, the following uses an example in which a time unit is a slot and the shared resource pool includes five physically consecutive slots, that is, a slot 1 to a slot 8. It should be understood that this is merely an example description herein, and a slot unit is not limited to using the slot as a unit, and may alternatively be a mini-slot, a symbol, or the like.

Each slot in a shared time-frequency resource may include a PSCCH resource, a PSSCH, and a PSFCH resource.

Step A3 and step A6 may also be performed at the same time. For example, the network device may preconfigure the R-RNTI corresponding to the path (the UE 0, the UE 1, the UE 2, the UE 3) for the UE 0, the UE 1, the UE 2, and the UE 3. The network device sends, to the UE 0, the UE 1, the UE 2, and the UE 3, a PDCCH 2 scrambled by using the R-RNTI, so that after receiving the PDCCH 2, the UE 0, the UE 1, the UE 2, and the UE 3 determine, based on the fact that scrambling code of the PDCCH 2 is the R-RNTI corresponding to the path (the UE 0, the UE 1, the UE 2, the UE 3), to perform multi-hop transmission on the path (the UE 0, the UE 1, the UE 2, the UE 3).

A7: The UE 0 sends data 1 to the UE 1 in the slot 1. Correspondingly, the UE 1 receives, in the slot 1, the data 1 sent by the UE 0. If successfully receiving the data 1, the UE 1 feeds back an ACK to the UE 0 on a PSFCH resource in the slot 1.

In an implementation, the UE 0 sends the data 1 on a PSSCH resource in the slot 1, and may alternatively send SCI on a PSCCH resource in the slot 1. The SCI may be scrambled by using an identifier of the UE 1. Therefore, when receiving the SCI, the UE 1 may start to receive the data 1 from the slot 1.

If the UE 0 receives, on the PSFCH resource in the slot 1, the ACK sent by the UE 1, the UE 0 may determine that the data 1 is successfully transmitted to the UE 1. If the UE 0 does not receive, on the PSFCH resource in the slot 1, the ACK sent by the UE 1, the UE 0 retransmits the data 1 to the UE 1 in the slot 2. The rest can be deduced by analogy, until the UE 1 successfully receives the data 1, or until a last slot (namely, the slot 8) in the shared resource pool is used.

When retransmitting the data 1 to the UE 1 in the slot 2, the UE 0 may send, on a PSCCH resource in the slot 2, SCI scrambled by using the identifier of the UE 1, or may occupy the PSCCH resource in the slot 2 to send the data 1.

Figure 8:
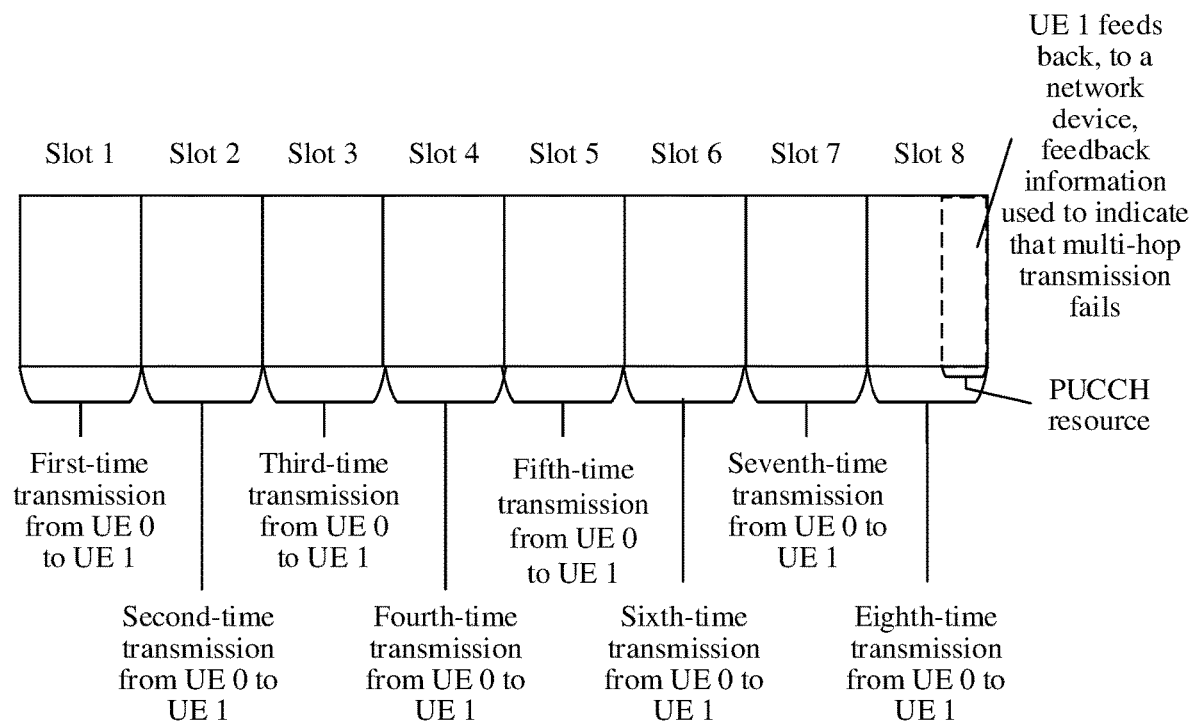
FIG. 8 is a schematic diagram of multi-hop transmission according to an embodiment of this application.

In an implementation, if all the eight slots in the shared resource pool are used, but the UE 1 still fails to receive the data sent by the UE 0, the UE 1 sends, to the network device, feedback information used to indicate that the multi-hop transmission fails, for example, as shown in FIG. 8.

A9: Assuming that the UE 1 successfully receives the data 1 sent by the UE 0 in the slot 2, the UE 1 sends the data 1 to the UE 2 in the slot 3. Correspondingly, the UE 2 receives, the data 1 sent by the UE 1 in the slot 3. If successfully receiving the data 1, the UE 2 feeds back an ACK to the UE 1 on a PSFCH resource in the slot 3.

In some embodiments, when the UE 1 sends the data 1 to the UE 2 in the slot 3, the UE 1 may decode the UE 0 on a PSSCH resource in the slot 2, to obtain original bits of the data 1. The UE 1 re-codes and modulates the original bits on the PSSCH resource in the slot 3 and forwards the original bits to the UE 2.

In an implementation, the UE 1 sends the data 1 on a PSSCH resource in the slot 3, and may alternatively send SCI on a PSCCH resource in the slot 3. The SCI may be scrambled by using an identifier of the UE 2. Therefore, when receiving the SCI, the UE 2 may start to receive the data 1 from the slot 3.

If the UE 1 receives, on the PSFCH resource in the slot 3, the ACK sent by the UE 2, the UE 1 may determine that the data 1 is successfully transmitted to the UE 2. If the UE 1 does not receive, on the PSFCH resource in the slot 3, the ACK sent by the UE 2, the UE 1 retransmits the data 1 to the UE 2 in the slot 4. The rest can be deduced by analogy, until the UE 2 successfully receives the data 1, or until a last slot (namely, the slot 8) in the shared resource pool is used.

When retransmitting the data 1 to the UE 2 in the slot 4, the UE 1 may send, on a PSCCH resource in the slot 4, SCI scrambled by using the identifier of the UE 2, or may occupy the PSCCH resource in the slot 4 to send the data 1.

Figure 9:
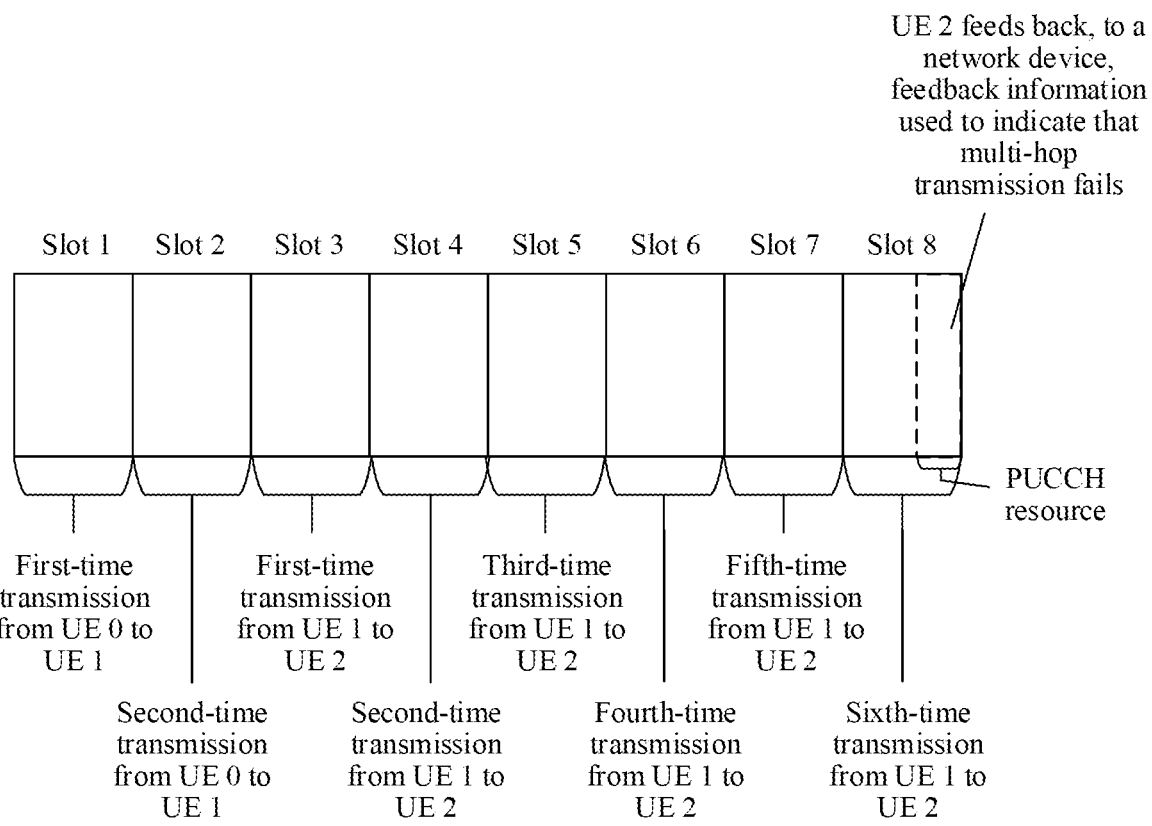
FIG. 9 is a schematic diagram of multi-hop transmission according to an embodiment of this application.

In an implementation, if all the eight slots in the shared resource pool are used, but the UE 2 still fails to receive the data sent by the UE 1, the UE 1 sends, to the network device, feedback information used to indicate that the multi-hop transmission fails, for example, as shown in FIG. 9.

A10: Assuming that the UE 2 successfully receives the data 1 sent by the UE 1 in the slot 3, the UE 2 sends the data 1 to the UE 3 in the slot 4. Correspondingly, the UE 3 receives the data 1 sent by the UE 2 in the slot 4. If successfully receiving the data 1, the UE 3 feeds back an ACK to the UE 2 on a PSFCH resource in the slot 4.

In some embodiments, when the UE 2 sends the data 1 to the UE 3 in the slot 4, the UE 2 may decode the UE 1 on a PSSCH resource in the slot 4, to obtain original bits of the data 1. The UE 1 re-codes and modulates the original bits on the PSSCH resource in the slot 3 and forwards the bit to the UE 2.

In an implementation, the UE 2 sends the data 1 on the PSSCH resource in the slot 4, and may alternatively send SCI on the PSCCH resource in the slot 4. The SCI may be scrambled by using an identifier of the UE 3. Therefore, when receiving the SCI, the UE 3 may start to receive the data 1 from the slot 4.

If the UE 2 receives, on a PSFCH resource in the slot 4, the ACK sent by the UE 3, the UE 2 may determine that the data 1 is successfully transmitted to the UE 3. If the UE 2 does not receive, on the PSFCH resource in the slot 4, the ACK sent by the UE 3, the UE 2 retransmits the data 1 to the UE 3 in the slot 5. The rest can be deduced by analogy, until the UE 3 successfully receives the data 1, or until a last slot (namely, the slot 8) in the shared resource pool is used.

When retransmitting the data 1 to the UE 3 in the slot 5, the UE 2 may send, on a PSCCH resource in the slot 5, SCI scrambled by using an identifier of the UE 3, or may occupy the PSCCH resource in the slot 5 to send the data 1.

Figure 10:
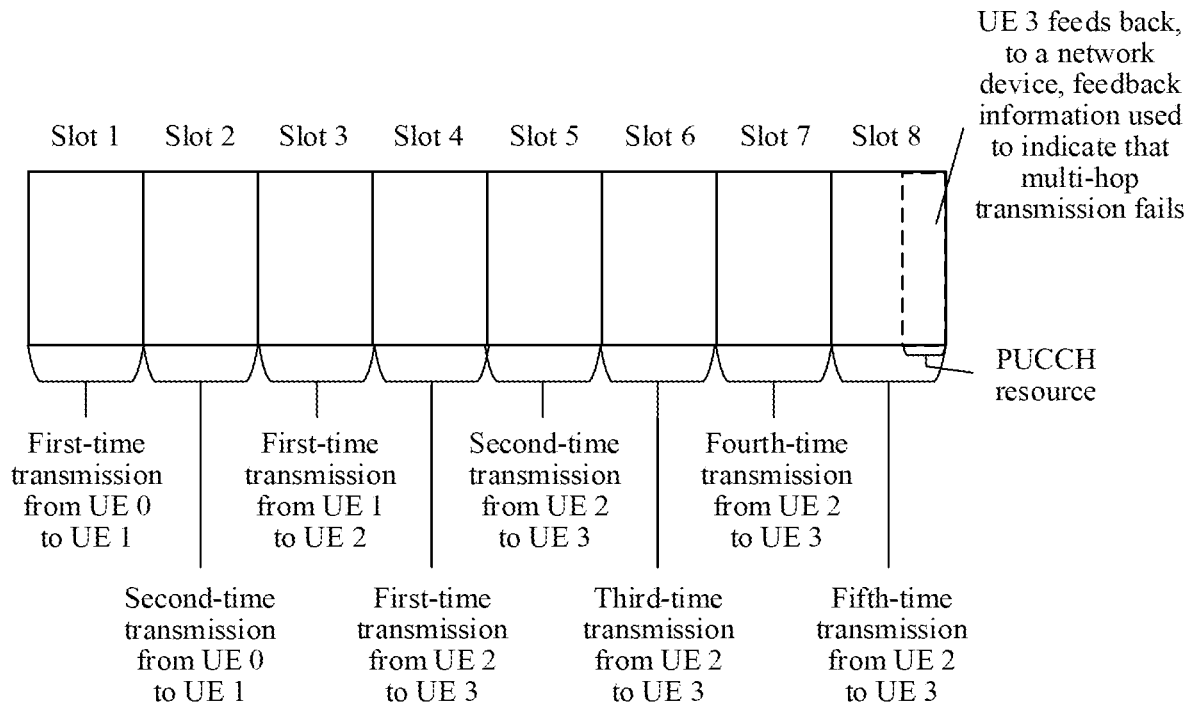
FIG. 10 is a schematic diagram of multi-hop transmission according to an embodiment of this application.

In an implementation, if all the eight slots in the shared resource pool are used, but the UE 3 still fails to receive the data sent by the UE 2, the UE 1 sends, to the network device, feedback information used to indicate that the multi-hop transmission fails, for example, as shown in FIG. 10.

Figure 11:
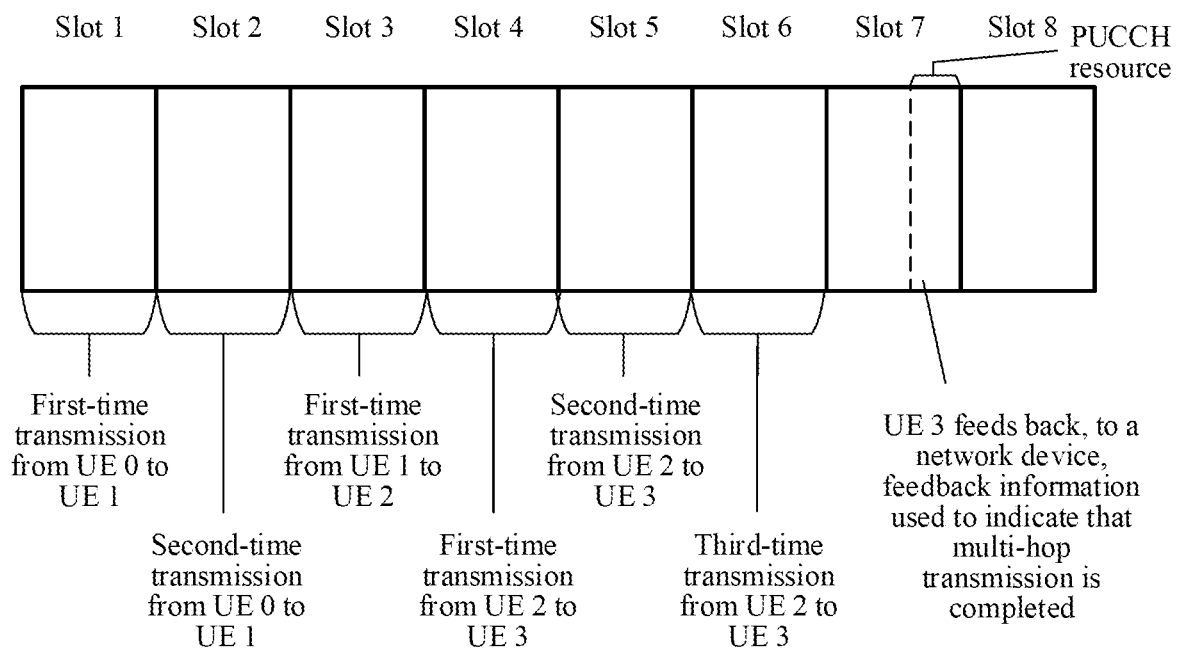
FIG. 11 is a schematic diagram of multi-hop transmission according to an embodiment of this application.

A11: Assuming that the UE 3 successfully receives the data 1 sent by the UE 2 in a slot 6, the UE 3 may send, to the network device on an uplink feedback channel in the slot 6, feedback information used to indicate that the multi-hop transmission is completed, for example, as shown in FIG. 11.

A12: The network device sends a PDCCH 3 to the UE 3, where the PDCCH 3 is used to configure a PUSCH resource.

In an implementation, after receiving the feedback information used to indicate that the multi-hop transmission is completed, the network device may alternatively release a slot 7 and a slot 8 in the shared resource pool.

A13: The UE 3 sends the data 1 to the network device on the PUSCH.

In some embodiments, the UE 3 may decode the data sent by the UE 0 on a PSSCH resource in the slot 6, to obtain original bits of the data 1. The UE 3 re-codes and modulates the original bits on the PUSCH resource, and forwards the PUSCH resource to the network device.

In the foregoing steps A7 to A10, each UE uses a same MCS for transmitting the data 1, that is, an MSC configured in configuration information in the shared resource pool. This may help the UE 0 to the UE 3 share resources included in the shared resource pool. In addition, the multi-hop transmission can be prevented from being terminated due to a transmission failure of a hop.

In the foregoing steps A7 to A10, a same RV sequence is used in each hop of transmission. For example, if an RV sequence is 0231, a $1^{st}$ RV in the RV sequence is RV 0, a 2nd RV in the RV sequence is RV 2, a $3^{rd}$ RV in the RV sequence is RV 3, and a 4th RV in the RV sequence is RV 1, UE of each hop performs transmission sequentially based on the sequence of 0231 when starting transmission, that is, an RV version used in kth (k=1, 2 . . . ) transmission at each hop is an RV version (k mod 4)$^{th}$ in the RV sequence. Using step A7 as an example, the UE 0 sends the data 1 to the UE 1 in the slot 1 by using the RV 0. If failing to transmit the data 1 in the slot 1, the UE 0 sends the data 1 to the UE 1 in the slot 2 by using the RV 2. If failing to transmit the data 1 in the slot 2, the UE 0 sends the data 1 to the UE 1 in the slot 3 by using the RV 3. If failing to transmit the data 1 in the slot 3, the UE 0 sends the data 1 to the UE 1 in the slot 4 by using the RV 1. If failing to transmit the data 1 in the slot 4, the UE 0 sends the data 1 to the UE 1 in the slot 5 by using the RV 0. This rule also applies to other cases.

When the network device configures frequency hopping patterns for resources in the shared resource pool, the frequency hopping patterns may vary according to time domain locations corresponding to different resources. Therefore, in the foregoing steps A7 to A10, a frequency hopping pattern corresponding to a resource may be used for each-time transmission. Using step A7 as an example, the UE 0 sends the data 1 to the UE 1 in the slot 1 by using a frequency hopping pattern corresponding to the slot 1. If the data 1 fails to be transmitted in the slot 1, the UE 0 sends the data 1 to the UE 1 in the slot 2 by using a frequency hopping pattern corresponding to the slot 2. If the data 1 fails to be transmitted in the slot 2, the UE 0 sends the data 1 to the UE 1 in the slot 3 by using a frequency hopping pattern corresponding to the slot 3. This rule also applies to other cases. In this manner, the frequency hopping pattern is related to a resource in the shared resource pool, and is not related to a terminal device in the multi-hop transmission. Therefore, anti-interference can be improved, and this helps the UE 0 to the UE 3 share resources included in the shared resource pool.

Scenario 2: Sidelink transmission and Uu link transmission may use a same frequency band. In other words, the sidelink transmission is in-band transmission. A multi-hop transmission process may include the following steps.

For details about steps B1 to B10, refer to the foregoing steps A1 to A10. Details are not described herein again.

Figure 12:
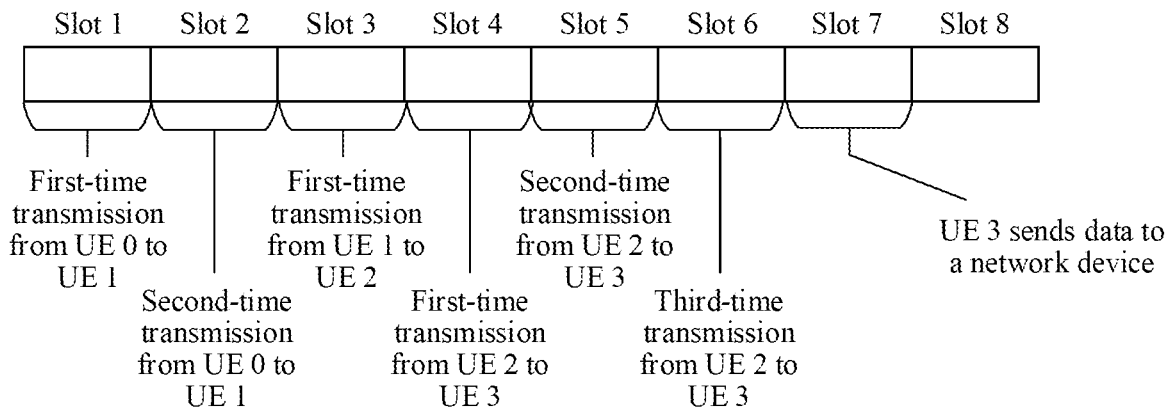
FIG. 12 is a schematic diagram of multi-hop transmission according to an embodiment of this application.

B11: Assuming that the UE 3 successfully receives the data 1 sent by the UE 2 in the slot 6, the UE 3 may send the data 1 to a network device in a slot 7, for example, as shown in FIG. 12.

In some embodiments, the UE 3 may decode the data sent by the UE 0 on a PSSCH resource in the slot 6, to obtain original bits of the data 1. The UE 3 re-codes and modulates the original bits on the PUSCH resource, and forwards the PUSCH resource to the network device.

Optionally, if the UE 3 fails to send the data 1 in the slot 7, the UE 3 may retransmit the data 1 to the network device in the slot 8.

Scenario 3: Sidelink transmission and Uu link transmission use different frequency bands. In other words, the sidelink transmission is out-of-band transmission, and scheduling-free transmission is used on a sidelink.

In the scenario 3, a path for multi-hop transmission and a shared resource pool may be preconfigured by the network device for the UE 0 to the UE 3, or the path for the multi-hop transmission and the shared resource pool may be configured for the UE 0 to the UE 3 in a scheduling-free manner.

For details about steps C1 to A7, refer to the foregoing steps A7 to A13. Details are not described herein again.

Scenario 4: Sidelink transmission and Uu link transmission may use a same frequency band. In other words, the sidelink transmission is in-band transmission, and scheduling-free transmission is used on a sidelink.

In the scenario 4, a path for multi-hop transmission and a shared resource pool may be preconfigured by the network device for the UE 0 to the UE 3, or the path for the multi-hop transmission and the shared resource pool may be configured for the UE 0 to the UE 3 in a scheduling-free manner.

For details about steps D1 to D5, refer to the foregoing steps B7 to B11. Details are not described herein again.

Figure 13:
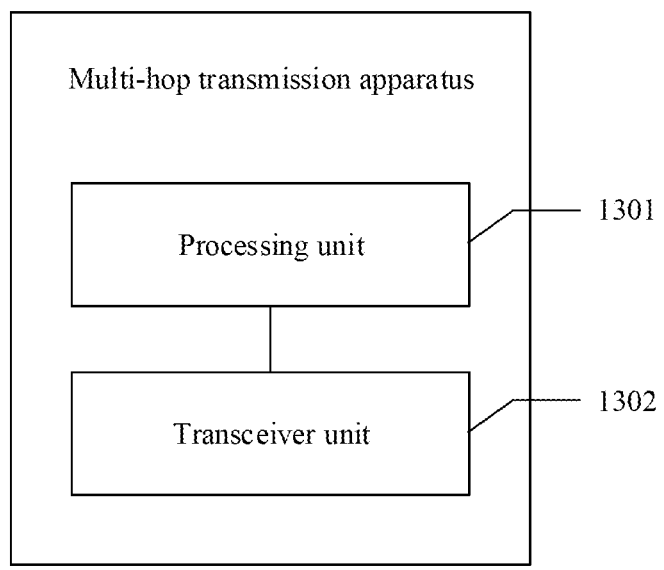
FIG. 13 is a schematic diagram of a structure of a multi-hop transmission apparatus according to an embodiment of this application.

Based on a same inventive concept as the method embodiments, an embodiment of this application provides a multi-hop transmission apparatus. The apparatus is used for a plurality of terminal devices that perform multi-hop transmission in a shared resource pool. A structure of the multi-hop transmission apparatus may be shown in FIG. 13, and includes a processing unit 1301 and a transceiver unit 1302.

In an implementation, the plurality of terminal devices include the multi-hop transmission apparatus, a second terminal device, and a third terminal device. The multi-hop transmission apparatus may be specifically configured to implement a method performed by the first terminal device in the embodiments in FIG. 2 to FIG. 6. The apparatus may be the first terminal device, or may be a chip or a chip group in the first terminal device, or a part that is of the chip in the first terminal device and that is configured to perform a related method function. The transceiver unit 1302 is configured to send data to the second terminal device. The processing unit 1301 is configured to: when the transceiver unit 1302 fails to send the data on a first resource, control the transceiver unit 1302 to retransmit the data to the second terminal device on a second resource. The shared resource pool includes the first resource and the second resource, and the first resource and the second resource are consecutive in time domain.

The transceiver unit 1302 is further configured to: before sending the data to the second terminal device on the first resource, receive indication information sent by a network device, where the indication information is used to indicate a path for the multi-hop transmission, and a next hop of the first terminal device on the path is the second terminal device.

For example, a same MCS configuration is used for each hop of the multi-hop transmission.

For example, each hop of the multi-hop transmission corresponds to a same redundancy version (RV) sequence.

In another implementation, the plurality of terminal devices include the first terminal device, the multi-hop transmission apparatus, and the third terminal device. The multi-hop transmission apparatus may be specifically configured to implement a method performed by the second terminal device in the embodiments in FIG. 2 to FIG. 6. The apparatus may be the second terminal device, or may be a chip or a chip group in the second terminal device, or a part that is of the chip in the second terminal device and that is configured to perform a related method function. The transceiver unit 1302 is configured to receive, data sent by the first terminal device on the first resource. The processing unit 1301 is configured to: when the transceiver unit 1302 successfully receives the data, control the transceiver unit 1302 to send first feedback information specific to the data to the first terminal device, and control the transceiver unit 1302 to send data to the third terminal device on the second resource. Alternatively, the processing unit 1301 is configured to: when the transceiver unit 1302 fails to receive the data, control the transceiver unit 1302 to receive, on the second resource, the data retransmitted by the first terminal device. The shared resource pool includes the first resource and the second resource, and the first resource and the second resource are consecutive in time domain.

The transceiver unit 1302 may be further configured to: before sending the data to the third terminal device on the second resource, receive indication information sent by the network device, where the indication information is used to indicate the path for the multi-hop transmission, and a next hop of the second terminal device on the path is the third terminal device.

For example, a same MCS configuration is used for each hop of the multi-hop transmission.

For example, each hop of the multi-hop transmission corresponds to a same redundancy version (RV) sequence.

The processing unit 1301 may be further configured to: after the transceiver unit 1302 receives, on the second resource, the data retransmitted by the first terminal device, if the second resource is a last resource in the shared resource pool, control the transceiver unit 1302 to send second feedback information to the network device, where the second feedback information is used to indicate that the multi-hop transmission fails.

In still another implementation, the plurality of terminal devices include the second terminal device and the multi-hop transmission apparatus. The multi-hop transmission apparatus may be specifically configured to implement a method performed by the third terminal device in the embodiments in FIG. 2 to FIG. 6. The apparatus may be the third terminal device, or may be a chip or a chip group in the third terminal device, or a part that is of the chip in the third terminal device and that is configured to perform a related method function. The transceiver unit 1302 is configured to receive, on the second resource, data sent by the second terminal device. The processing unit 1301 is configured to: when the transceiver unit 1302 successfully receives the data, control the transceiver unit 1302 to send the first feedback information to the network device, where the first feedback information is used to indicate that the multi-hop transmission is completed. Alternatively, the processing unit 1301 is configured to: when the transceiver unit 1302 successfully receives the data and a third resource is unused, control the transceiver unit 1302 to send data to the network device on the third resource. The shared resource pool includes the second resource and the third resource, and the second resource and the third resource are consecutive in time domain.

In some embodiments, the transceiver unit 1302 is further configured to: before sending the first feedback information to the network device, receive the indication information sent by the network device, where the indication information is used to indicate the path for the multi-hop transmission, and a next hop of the third terminal device on the path is the network device.

In some other embodiments, the processing unit 1301 is further configured to: before sending the data to the network device on the third resource, receive the indication information sent by the network device, where the indication information is used to indicate the path for the multi-hop transmission, and a next hop of the third terminal device on the path is the network device.

For example, a same MCS configuration is used for each hop of the multi-hop transmission.

For example, each hop of the multi-hop transmission corresponds to a same redundancy version (RV) sequence.

Division into modules in embodiments of this application is an example, and is merely logical function division. During actual implementation, there may be another division manner. In addition, functional modules in embodiments of this application may be integrated into one processor, or each of the modules may exist alone physically, or two or more modules are integrated into one module. The integrated module may be implemented in a form of hardware, or may be implemented in a form of a software function module. It may be understood that, for functions or implementations of the modules in embodiments of this application, further refer to related descriptions in the method embodiments.

Figure 14:
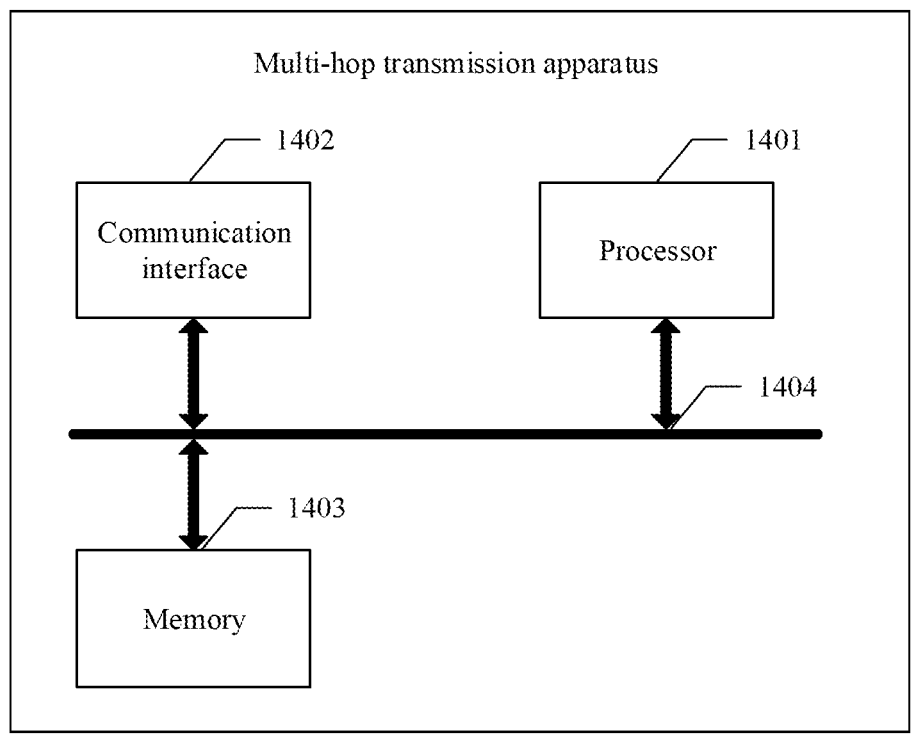
FIG. 14 is a schematic diagram of a structure of another multi-hop transmission apparatus according to an embodiment of this application.

In a possible manner, an apparatus determining a random access resource may be shown in FIG. 14, and the apparatus may be a communication device or a chip in the communication device. The apparatus may include a processor 1401, a communication interface 1402, and a memory 1403. The processing unit 1301 may be the processor 1401. The transceiver unit 1302 may be the communication interface 1402.

The processor 1401 may be a central processing unit (CPU), a digital processing unit, or the like. The communication interface 1402 may be a transceiver, an interface circuit such as a transceiver circuit, a transceiver chip, or the like. The apparatus further includes the memory 1403, configured to store a program executed by the processor 1401. The memory 1403 may be a nonvolatile memory, for example, a hard disk drive (HDD) or a solid-state drive (SSD), or may be a volatile memory, for example, a random access memory (RAM). The memory 1403 is any other medium that can carry or store expected program code in a form of instructions or a data structure and can be accessed by a computer, but is not limited thereto.

The processor 1401 is configured to execute the program code stored in the memory 1403, and is specifically configured to perform an action of the processing unit 1301. Details are not described in this application herein again. The communication interface 1402 is specifically configured to perform an action of the transceiver unit 1302. Details are not described herein in this application.

A specific connection medium between the communication interface 1402, the processor 1401, and the memory 1403 is not limited in this embodiment of this application. In this embodiment of this application, in FIG. 14, the memory 1403, the processor 1401, and the communication interface 1402 are connected by using a bus 1404. The bus is represented by using a bold line in FIG. 14, and a connection manner between other parts is merely used as an example for description, and does not constitute a limitation. The bus may be classified into an address bus, a data bus, a control bus, and the like. For ease of representation, only one bold line is used to represent the bus in FIG. 14, but this does not mean that there is only one bus or only one type of bus.

An embodiment of the present invention further provides a computer-readable storage medium, configured to store computer software instructions that need to be executed by the processor. The computer software instructions include a program that needs to be executed by the processor.

A person skilled in the art should understand that embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or the processor of any other programmable data processing device generate an apparatus for implementing a specific function in one or more processes in the flowcharts and/or in one or more blocks in the block diagrams.

These computer program instructions may be stored in a computer-readable memory that can indicate the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

Certainly, a person skilled in the art can make various modifications and variations to this application without departing from the protection scope of this application. This application is intended to cover these modifications and variations of this application provided that they fall within the scope of the claims of this application and equivalent technologies thereof.

The invention claimed is:

1. A multi-hop transmission method, wherein the method is applied to a first terminal device of a plurality of terminal devices that perform multi-hop transmission in a shared resource pool, the plurality of terminal devices comprises the first terminal device, a second terminal device and a third terminal device, and the method comprises:
sending data to the second terminal device on a first resource included in the shared resource pool;
in response to the first terminal device failing to send the data on the first resource, retransmitting the data to the second terminal device on a second resource included in the shared resource pool; and
in response to the first terminal device successfully sending the data to the second terminal device, receiving first feedback information specific to the data from the second terminal device, wherein the data is transmitted by the second terminal device to the third terminal device,
wherein the shared resource pool is configured for sharing by the plurality of terminal devices participating in the multi-hop transmission, and the first resource and the second resource are consecutive in time domain, and
wherein same modulation and coding scheme (MCS) configuration is used for each hop of the multi-hop transmission,
wherein each hop of the multi-hop transmission corresponds to a same redundancy version (RV) sequence including a plurality of RVs.

2. The method according to claim 1, wherein before the sending of the data to the second terminal device, the method further comprises:
receiving indication information sent by a network device, wherein the indication information indicates a path for the multi-hop transmission, and a next hop of the first terminal device on the path is the second terminal device.

3. The method according to claim 1, wherein the plurality of RVs is sequentially used in each hop of the multi-hop transmission.

4. A multi-hop transmission method, wherein the method is applied to a second terminal device of a plurality of terminal devices that perform multi-hop transmission in a shared resource pool, the plurality of terminal devices comprises a first terminal device, the second terminal device, and a third terminal device, and the method comprises:
receiving data sent by the first terminal device on a first resource included in the shared resource pool;
in response to the second terminal device failing to receive the data, receiving, on a second resource included in the shared resource pool, the data retransmitted by the first terminal device; and
in response to the second terminal device successfully receiving the data, sending first feedback information specific to the data to the first terminal device, and sending the data to the third terminal device on a resource included in the shared resource pool, wherein
the shared resource pool is configured for sharing by the plurality of terminal devices participating in the multi-hop transmission, and the first resource and the second resource are consecutive in time domain,
wherein same modulation and coding scheme (MCS) configuration is used for each hop of the multi-hop transmission,
wherein each hon of the multi-hop transmission corresponds to a same redundancy version (RV) sequence including a plurality of RVs.

5. The method according to claim 4, wherein
before the sending of the data to the third terminal device, the method further comprises:
receiving indication information sent by a network device, wherein the indication information indicates a path for the multi-hop transmission, and a next hop of the second terminal device on the path is the third terminal device.

6. The method according to claim 5, wherein after the receiving of the data retransmitted by the first terminal device, and the method further comprises:

in response to the second resource being a last resource in the shared resource pool, sending second feedback information to the network device, wherein the second feedback information indicates that the multi-hop transmission fails.

7. A multi-hop transmission apparatus, wherein the apparatus is applied to a first terminal device of a plurality of terminal devices that performs multi-hop transmission in a shared resource pool, the plurality of terminal devices comprises the first terminal device, a second terminal device and a third terminal device, and the apparatus comprises:
one or more processors, and
a storage medium configured to store program instructions;
wherein, when executed by the one or more processors, the program instructions cause the apparatus to perform operations comprising:
sending data to the second terminal device;
in response to the apparatus failing to send the data on a first resource included in the shared resource pool, retransmitting the data to the second terminal device on a second resource included in the shared resource pool; and
in response to the apparatus successfully sending the data to the second terminal device, receiving first feedback information specific to the data from the second terminal device, wherein the data is transmitted by the second terminal device to the third terminal device, wherein the shared resource pool is configured for sharing by the plurality of terminal devices participating in the multi-hop transmission, and the first resource and the second resource are consecutive in time domain,
wherein a same modulation and coding scheme (MCS) configuration is used for each hop of the multi-hop transmission,
wherein each hop of the multi-hop transmission cor dancy version (RV) sequence including a plurality of RVs.

8. The apparatus according to claim 7, wherein the operations further comprise: before sending the data to the second terminal device on the first resource, receiving indication information from a network device, wherein the indication information indicates a path for the multi-hop transmission, and a next hop of a first terminal device on the path is the second terminal device.

9. The apparatus according to claim 7, wherein the first resource and the second resource each comprise a physical sidelink shared channel (PSSCH) resource, a physical sidelink feedback channel (PSFCH) resource and/or a Physical Sidelink Control Channel (PSCCH).

10. The apparatus according to claim 9, wherein the first and second resources each comprise a PSSCH resource used to send bearer data, and/or a PSCCH resource used to send sidelink control information (SCI).

11. The apparatus according to claim 9, wherein the first and second resources each comprise an uplink feedback channel used to send feedback information for data, the feedback information includes acknowledgment (ACK) and/or negative acknowledgment (NACK) indicating whether indicate whether the multi-hop transmission succeeds.

12. A multi-hop transmission apparatus, wherein the apparatus is applied to a second terminal device of a plurality of terminal devices that performs multi-hop transmission in a shared resource pool, the plurality of terminal devices comprises a first terminal device, the second terminal device, and a third terminal device, and the apparatus comprises:
one or more processors, and
a storage medium configured to store program instructions;
wherein, when executed by the one or more processors, the program instructions cause the apparatus to perform operations comprising:
receiving data from the first terminal device on a first resource included in the shared resource pool;
in response to the apparatus successfully receiving the data, sending first feedback information specific to the data to the first terminal device, and sending the data to the third terminal device on a second resource included in the shared resource pool; and
in response to the apparatus failing to receive the data, receiving, the data retransmitted by the first terminal device on the second resource included in the shared resource pool, wherein
the shared resource pool is configured for sharing by the plurality of terminal devices participating in the multi-hop transmission, and the first resource and the second resource are consecutive in time domain,
wherein a same modulation and coding scheme (MCS) configuration is used for each hop of the multi-hop transmission,
wherein each hop of the molti-hop transmission responds to a same redundancy version (RV) sequence including a plurality of RVs.

13. The apparatus according to claim 12, wherein the operations further comprise:
before sending the data to the third terminal device on the second resource, receiving indication information from a network device, wherein the indication information indicates a path for the multi-hop transmission, and a next hop of the apparatus on the path is the third terminal device.

14. The apparatus according to claim 13, wherein the operations further comprise: after receiving the data retransmitted by the first terminal device on the second resource, in response to the second resource being a last resource in the shared resource pool, sending second feedback information to the network device, wherein the second feedback information indicates that the multi-hop transmission fails.

\* \* \* \* \*

UNITED STATES PATENT AND TRADEMARK OFFICE
CERTIFICATE OF CORRECTION

PATENT NO. : 12,166,665 B2
APPLICATION NO. : 17/852701
DATED : December 10, 2024
INVENTOR(S) : Mengying Ding et al.

Page 1 of 1

It is certified that error appears in the above-identified patent and that said Letters Patent is hereby corrected as shown below:

In the Claims

Column 26, Claim 4, Line 54, change "wherein each hon" to --wherein each hop--.

Signed and Sealed this
Seventh Day of January, 2025

Derrick Brent
*Acting Director of the United States Patent and Trademark Office*